(12) United States Patent
Chandrasekaran

(10) Patent No.: US 9,099,232 B2
(45) Date of Patent: Aug. 4, 2015

(54) MAGNETIC DEVICE AND POWER CONVERTER EMPLOYING THE SAME

(75) Inventor: Sriram Chandrasekaran, Lucas, TX (US)

(73) Assignee: Power Systems Technologies Ltd., Ebene (MU)

( * ) Notice: Subject to any disclaimer, the term of this patent is extended or adjusted under 35 U.S.C. 154(b) by 338 days.

(21) Appl. No.: 13/550,383

(22) Filed: Jul. 16, 2012

(65) Prior Publication Data
US 2014/0016367 A1    Jan. 16, 2014

(51) Int. Cl.
| | |
|---|---|
| *H02M 3/335* | (2006.01) |
| *H01F 3/10* | (2006.01) |
| *H02M 3/155* | (2006.01) |
| *H02M 3/158* | (2006.01) |
| *H02M 3/337* | (2006.01) |
| *H02M 1/42* | (2007.01) |
| *H01F 27/38* | (2006.01) |
| *H02M 1/00* | (2007.01) |

(52) U.S. Cl.
CPC ................. *H01F 3/10* (2013.01); *H01F 27/38* (2013.01); *H02M 1/4225* (2013.01); *H02M 3/155* (2013.01); *H02M 3/1582* (2013.01); *H02M 3/337* (2013.01); *H02M 3/33576* (2013.01); *H02M 2001/0064* (2013.01); *H02M 2003/1586* (2013.01); *Y02B 70/126* (2013.01)

(58) Field of Classification Search
USPC .......... 323/334, 335, 338, 328, 340; 336/145, 336/150, 170, 182, 183, 212, 221, 222; 363/21.12
See application file for complete search history.

(56) References Cited

U.S. PATENT DOCUMENTS

| | | | |
|---|---|---|---|
| 1,376,978 | A | 5/1921 | Stoekle |
| 2,473,662 | A | 6/1949 | Pohm |
| 3,007,060 | A | 10/1961 | Guenther |
| 3,142,809 | A | 7/1964 | Remenyik |
| 3,346,798 | A | 10/1967 | Dinger |
| 3,358,210 | A | 12/1967 | Grossoehme |
| 3,433,998 | A | 3/1969 | Woelber |
| 3,484,562 | A | 12/1969 | Kronfeld |
| 3,546,571 | A | 12/1970 | Fletcher et al. |
| 3,553,620 | A | 1/1971 | Cielo et al. |
| 3,602,795 | A | 8/1971 | Gunn |

(Continued)

FOREIGN PATENT DOCUMENTS

| | | |
|---|---|---|
| CN | 1735948 | 2/2006 |
| CN | 101141099 | 3/2008 |

(Continued)

OTHER PUBLICATIONS

"AN100: Application Note using Lx100 Family of High Performance N-Ch JFET Transistors," AN100.Rev 1.01, Sep. 2003, 5 pp., Lovoltech, Inc., Santa Clara, CA.

(Continued)

*Primary Examiner* — Emily P Pham
(74) *Attorney, Agent, or Firm* — Boisbrun Hofman, PLLC

(57) ABSTRACT

A magnetic device and power converter employing the same. In one embodiment, the magnetic device includes a first L-core segment including a first leg and a second leg extending therefrom, and an opposing second L-core segment including a first leg and a second leg extending therefrom. The magnetic device also includes a winding formed around at least one of the first leg and the second leg of the first L-core segment or the second L-core segment.

20 Claims, 28 Drawing Sheets

(56) References Cited

U.S. PATENT DOCUMENTS

| | | | |
|---|---|---|---|
| 3,622,868 A | 11/1971 | Todt |
| 3,681,679 A | 8/1972 | Chung |
| 3,708,742 A | 1/1973 | Gunn |
| 3,708,744 A | 1/1973 | Stephens et al. |
| 4,019,122 A | 4/1977 | Ryan |
| 4,075,547 A | 2/1978 | Wroblewski |
| 4,202,031 A | 5/1980 | Hesler et al. |
| 4,257,087 A | 3/1981 | Cuk |
| 4,274,071 A | 6/1981 | Pfarre |
| 4,327,348 A | 4/1982 | Hirayama |
| 4,471,423 A | 9/1984 | Hase |
| 4,499,481 A | 2/1985 | Greene |
| 4,570,174 A | 2/1986 | Huang et al. |
| 4,577,268 A | 3/1986 | Easter et al. |
| 4,581,691 A | 4/1986 | Hock |
| 4,613,841 A | 9/1986 | Roberts |
| 4,636,823 A | 1/1987 | Margalit et al. |
| 4,660,136 A | 4/1987 | Montorefano |
| 4,770,667 A | 9/1988 | Evans et al. |
| 4,770,668 A | 9/1988 | Skoultchi et al. |
| 4,785,387 A | 11/1988 | Lee et al. |
| 4,799,138 A | 1/1989 | Chahabadi et al. |
| 4,803,609 A | 2/1989 | Gillett et al. |
| 4,823,249 A | 4/1989 | Garcia, II |
| 4,837,496 A | 6/1989 | Erdi |
| 4,853,668 A | 8/1989 | Bloom |
| 4,864,478 A * | 9/1989 | Bloom ............... 363/16 |
| 4,866,367 A | 9/1989 | Ridley et al. |
| 4,876,638 A | 10/1989 | Silva et al. |
| 4,887,061 A | 12/1989 | Matsumura |
| 4,899,271 A | 2/1990 | Seiersen |
| 4,903,089 A | 2/1990 | Hollis et al. |
| 4,922,400 A | 5/1990 | Cook |
| 4,962,354 A | 10/1990 | Visser et al. |
| 4,964,028 A | 10/1990 | Spataro |
| 4,999,759 A | 3/1991 | Cavagnolo et al. |
| 5,003,277 A | 3/1991 | Sokai et al. |
| 5,027,264 A | 6/1991 | DeDoncker et al. |
| 5,068,756 A | 11/1991 | Morris et al. |
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,172,309 A | 12/1992 | DeDoncker et al. |
| 5,177,460 A | 1/1993 | Dhyanchand et al. |
| 5,182,535 A | 1/1993 | Dhyanchand |
| 5,204,809 A | 4/1993 | Andresen |
| 5,206,621 A | 4/1993 | Yerman |
| 5,208,739 A | 5/1993 | Sturgeon |
| 5,223,449 A | 6/1993 | Morris et al. |
| 5,225,971 A | 7/1993 | Spreen |
| 5,231,037 A | 7/1993 | Yuan et al. |
| 5,244,829 A | 9/1993 | Kim |
| 5,262,930 A | 11/1993 | Hua et al. |
| 5,282,126 A | 1/1994 | Husgen |
| 5,283,728 A * | 2/1994 | Hobart ............... 363/100 |
| 5,285,396 A | 2/1994 | Aoyama |
| 5,291,382 A | 3/1994 | Cohen |
| 5,303,138 A | 4/1994 | Rozman |
| 5,305,191 A | 4/1994 | Loftus, Jr. |
| 5,335,163 A | 8/1994 | Seiersen |
| 5,336,985 A | 8/1994 | McKenzie |
| 5,342,795 A | 8/1994 | Yuan et al. |
| 5,343,140 A | 8/1994 | Gegner |
| 5,353,001 A | 10/1994 | Meinel et al. |
| 5,369,042 A | 11/1994 | Morris et al. |
| 5,374,887 A | 12/1994 | Drobnik |
| 5,399,968 A | 3/1995 | Sheppard et al. |
| 5,407,842 A | 4/1995 | Morris et al. |
| 5,450,307 A | 9/1995 | Yasumura |
| 5,459,652 A | 10/1995 | Faulk |
| 5,461,555 A | 10/1995 | Kitajima et al. |
| 5,468,661 A | 11/1995 | Yuan et al. |
| 5,477,175 A | 12/1995 | Tisinger et al. |
| 5,508,903 A | 4/1996 | Alexndrov |
| 5,523,673 A | 6/1996 | Ratliff et al. |
| 5,539,630 A | 7/1996 | Pietkiewicz et al. |
| 5,554,561 A | 9/1996 | Plumton |
| 5,555,494 A | 9/1996 | Morris |
| 5,572,079 A | 11/1996 | Pinkerton |
| 5,581,224 A | 12/1996 | Yamaguchi |
| 5,610,085 A | 3/1997 | Yuan et al. |
| 5,624,860 A | 4/1997 | Plumton et al. |
| 5,663,876 A | 9/1997 | Newton et al. |
| 5,700,703 A | 12/1997 | Huang et al. |
| 5,712,189 A | 1/1998 | Plumton et al. |
| 5,719,544 A | 2/1998 | Vinciarelli et al. |
| 5,731,666 A | 3/1998 | Folker et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A | 6/1998 | Lahr et al. |
| 5,783,984 A | 7/1998 | Keuneke |
| 5,784,266 A | 7/1998 | Chen |
| 5,804,943 A | 9/1998 | Kollman et al. |
| 5,815,383 A | 9/1998 | Lei |
| 5,815,386 A | 9/1998 | Gordon |
| 5,864,110 A | 1/1999 | Moriguchi et al. |
| 5,870,299 A | 2/1999 | Rozman |
| 5,880,942 A | 3/1999 | Leu |
| 5,886,508 A | 3/1999 | Jutras |
| 5,889,298 A | 3/1999 | Plumton et al. |
| 5,889,373 A | 3/1999 | Fisher et al. |
| 5,889,660 A | 3/1999 | Taranowski et al. |
| 5,900,822 A | 5/1999 | Sand et al. |
| 5,907,231 A | 5/1999 | Watanabe et al. |
| 5,907,481 A | 5/1999 | Svardsjo |
| 5,909,110 A | 6/1999 | Yuan et al. |
| 5,910,665 A | 6/1999 | Plumton et al. |
| 5,920,475 A | 7/1999 | Boylan et al. |
| 5,925,088 A | 7/1999 | Nasu |
| 5,929,665 A | 7/1999 | Ichikawa et al. |
| 5,933,338 A | 8/1999 | Wallace |
| 5,940,287 A | 8/1999 | Brkovic |
| 5,946,207 A | 8/1999 | Schoofs |
| 5,956,245 A | 9/1999 | Rozman |
| 5,956,578 A | 9/1999 | Weitzel et al. |
| 5,959,850 A | 9/1999 | Lim |
| 5,977,853 A | 11/1999 | Ooi et al. |
| 5,999,066 A | 12/1999 | Saito et al. |
| 5,999,429 A | 12/1999 | Brown |
| 6,003,139 A | 12/1999 | McKenzie |
| 6,008,519 A | 12/1999 | Yuan et al. |
| 6,011,703 A | 1/2000 | Boylan et al. |
| 6,038,154 A | 3/2000 | Boylan et al. |
| 6,046,664 A | 4/2000 | Weller et al. |
| 6,055,166 A | 4/2000 | Jacobs |
| 6,060,943 A | 5/2000 | Jansen |
| 6,067,237 A | 5/2000 | Nguyen |
| 6,069,798 A | 5/2000 | Liu |
| 6,069,799 A | 5/2000 | Bowman et al. |
| 6,078,510 A | 6/2000 | Spampinato et al. |
| 6,084,792 A | 7/2000 | Chen et al. |
| 6,094,038 A | 7/2000 | Lethellier |
| 6,097,046 A | 8/2000 | Plumton |
| 6,125,046 A | 9/2000 | Jang et al. |
| 6,144,187 A | 11/2000 | Bryson |
| 6,147,886 A | 11/2000 | Wittenbreder |
| 6,156,611 A | 12/2000 | Lan et al. |
| 6,160,721 A | 12/2000 | Kossives et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 | 9/2001 | Nakamura et al. |
| 6,288,920 B1 | 9/2001 | Jacobs et al. |
| 6,295,217 B1 | 9/2001 | Yang et al. |

(56) References Cited

U.S. PATENT DOCUMENTS

| | | |
|---|---|---|
| 6,304,460 B1 | 10/2001 | Cuk |
| 6,309,918 B1 | 10/2001 | Huang et al. |
| 6,317,021 B1 | 11/2001 | Jansen |
| 6,317,337 B1 | 11/2001 | Yasumura |
| 6,320,490 B1 | 11/2001 | Clayton |
| 6,323,090 B1 | 11/2001 | Zommer |
| 6,325,035 B1 | 12/2001 | Codina et al. |
| 6,344,986 B1 | 2/2002 | Jain et al. |
| 6,345,364 B1 | 2/2002 | Lee |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,373,727 B1 | 4/2002 | Hedenskog et al. |
| 6,373,734 B1 | 4/2002 | Martinelli |
| 6,380,836 B2 | 4/2002 | Matsumoto et al. |
| 6,388,898 B1 | 5/2002 | Fan et al. |
| 6,392,902 B1 | 5/2002 | Jang et al. |
| 6,400,579 B2 | 6/2002 | Cuk |
| 6,414,578 B1 | 7/2002 | Jitaru |
| 6,438,009 B2 | 8/2002 | Assow |
| 6,462,965 B1 | 10/2002 | Uesono |
| 6,466,461 B2 | 10/2002 | Mao et al. |
| 6,469,564 B1 | 10/2002 | Jansen |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,504,321 B2 | 1/2003 | Giannopoulos et al. |
| 6,512,352 B2 | 1/2003 | Qian |
| 6,525,603 B1 | 2/2003 | Morgan |
| 6,539,299 B2 | 3/2003 | Chatfield et al. |
| 6,545,453 B2 | 4/2003 | Glinkowski et al. |
| 6,548,992 B1 | 4/2003 | Alcantar et al. |
| 6,549,436 B1 | 4/2003 | Sun |
| 6,552,917 B1 | 4/2003 | Bourdillon |
| 6,563,725 B2 | 5/2003 | Carsten |
| 6,570,268 B1 | 5/2003 | Perry et al. |
| 6,580,627 B2 | 6/2003 | Toshio |
| 6,597,592 B2 | 7/2003 | Carsten |
| 6,608,768 B2 | 8/2003 | Sula |
| 6,611,132 B2 | 8/2003 | Nakagawa et al. |
| 6,614,206 B1 | 9/2003 | Wong et al. |
| 6,654,259 B2 | 11/2003 | Koshita et al. |
| 6,661,276 B1 | 12/2003 | Chang |
| 6,668,296 B1 | 12/2003 | Dougherty et al. |
| 6,674,658 B2 | 1/2004 | Mao et al. |
| 6,683,797 B2 | 1/2004 | Zaitsu et al. |
| 6,687,137 B1 | 2/2004 | Yasumura |
| 6,696,910 B2 | 2/2004 | Nuytkens et al. |
| 6,731,486 B2 | 5/2004 | Holt et al. |
| 6,741,099 B1 | 5/2004 | Krugly |
| 6,751,106 B2 | 6/2004 | Zhang et al. |
| 6,753,723 B2 | 6/2004 | Zhang |
| 6,765,810 B2 | 7/2004 | Perry |
| 6,775,159 B2 | 8/2004 | Webb et al. |
| 6,784,644 B2 | 8/2004 | Xu et al. |
| 6,804,125 B2 | 10/2004 | Brkovic |
| 6,813,170 B2 | 11/2004 | Yang |
| 6,831,847 B2 | 12/2004 | Perry |
| 6,856,149 B2 | 2/2005 | Yang |
| 6,862,194 B2 | 3/2005 | Yang et al. |
| 6,867,678 B2 | 3/2005 | Yang |
| 6,867,986 B2 | 3/2005 | Amei |
| 6,873,237 B2 | 3/2005 | Chandrasekaran et al. |
| 6,882,548 B1 | 4/2005 | Jacobs et al. |
| 6,906,934 B2 | 6/2005 | Yang et al. |
| 6,943,553 B2 | 9/2005 | Zimmermann |
| 6,944,033 B1 | 9/2005 | Xu et al. |
| 6,977,824 B1 | 12/2005 | Yang et al. |
| 6,980,077 B1 | 12/2005 | Chandrasekaran et al. |
| 6,982,887 B2 | 1/2006 | Batarseh et al. |
| 7,009,486 B1 | 3/2006 | Goeke et al. |
| 7,012,414 B1 | 3/2006 | Mehrotra et al. |
| 7,016,204 B2 | 3/2006 | Yang et al. |
| 7,026,807 B2 | 4/2006 | Anderson et al. |
| 7,034,586 B2 | 4/2006 | Mehas et al. |
| 7,034,647 B2 | 4/2006 | Yan et al. |
| 7,046,523 B2 | 5/2006 | Sun et al. |
| 7,061,358 B1 | 6/2006 | Yang |
| 7,072,189 B2 | 7/2006 | Kim et al. |
| 7,075,799 B2 | 7/2006 | Qu |
| 7,076,360 B1 | 7/2006 | Ma |
| 7,095,638 B2 | 8/2006 | Uusitalo |
| 7,098,640 B2 | 8/2006 | Brown |
| 7,099,163 B1 | 8/2006 | Ying |
| 7,136,293 B2 | 11/2006 | Petkov et al. |
| 7,148,669 B2 | 12/2006 | Maksimovic et al. |
| 7,170,268 B2 | 1/2007 | Kim |
| 7,176,662 B2 | 2/2007 | Chandrasekaran |
| 7,209,024 B2 | 4/2007 | Nakahori |
| 7,269,038 B2 | 9/2007 | Shekhawat et al. |
| 7,280,026 B2 | 10/2007 | Chandrasekaran et al. |
| 7,285,807 B2 | 10/2007 | Brar et al. |
| 7,295,092 B2 | 11/2007 | Elliott et al. |
| 7,298,118 B2 | 11/2007 | Chandrasekaran |
| 7,301,785 B2 | 11/2007 | Yasumura |
| 7,312,686 B2 | 12/2007 | Bruno |
| 7,321,283 B2 | 1/2008 | Mehrotra et al. |
| 7,332,992 B2 | 2/2008 | Iwai |
| 7,339,208 B2 | 3/2008 | Brar et al. |
| 7,339,801 B2 | 3/2008 | Yasumura |
| 7,348,612 B2 | 3/2008 | Sriram et al. |
| 7,360,004 B2 | 4/2008 | Dougherty et al. |
| 7,362,592 B2 | 4/2008 | Yang et al. |
| 7,362,593 B2 | 4/2008 | Yang et al. |
| 7,375,607 B2 | 5/2008 | Lee et al. |
| 7,385,375 B2 | 6/2008 | Rozman |
| 7,386,404 B2 | 6/2008 | Cargonja et al. |
| 7,417,875 B2 | 8/2008 | Chandrasekaran et al. |
| 7,427,910 B2 | 9/2008 | Mehrotra et al. |
| 7,431,862 B2 | 10/2008 | Mehrotra et al. |
| 7,439,556 B2 | 10/2008 | Brar et al. |
| 7,439,557 B2 | 10/2008 | Brar et al. |
| 7,443,274 B2 | 10/2008 | Lee et al. |
| 7,446,512 B2 | 11/2008 | Nishihara et al. |
| 7,447,049 B2 | 11/2008 | Garner et al. |
| 7,462,891 B2 | 12/2008 | Brar et al. |
| 7,468,649 B2 | 12/2008 | Chandrasekaran |
| 7,471,523 B2 | 12/2008 | Yang |
| 7,489,225 B2 | 2/2009 | Dadafshar |
| 7,499,295 B2 | 3/2009 | Indika de Silva et al. |
| 7,541,640 B2 | 6/2009 | Brar et al. |
| 7,554,430 B2 | 6/2009 | Mehrotra et al. |
| 7,558,082 B2 | 7/2009 | Jitaru |
| 7,567,445 B2 | 7/2009 | Coulson et al. |
| 7,630,219 B2 | 12/2009 | Lee |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,675,764 B2 | 3/2010 | Chandrasekaran et al. |
| 7,715,217 B2 | 5/2010 | Manabe et al. |
| 7,733,679 B2 | 6/2010 | Luger et al. |
| 7,746,041 B2 | 6/2010 | Xu et al. |
| 7,778,050 B2 | 8/2010 | Yamashita |
| 7,778,051 B2 | 8/2010 | Yang |
| 7,787,264 B2 | 8/2010 | Yang et al. |
| 7,791,903 B2 | 9/2010 | Zhang et al. |
| 7,795,849 B2 | 9/2010 | Sohma |
| 7,813,101 B2 | 10/2010 | Morikawa |
| 7,847,535 B2 | 12/2010 | Meynard et al. |
| 7,876,191 B2 | 1/2011 | Chandrasekaran et al. |
| 7,889,517 B2 | 2/2011 | Artusi et al. |
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,125,205 B2 | 2/2012 | Chandrasekaran et al. |
| 8,134,443 B2 | 3/2012 | Chandrasekaran et al. |

(56) References Cited

U.S. PATENT DOCUMENTS

| | | |
|---|---|---|
| 8,179,699 B2 | 5/2012 | Tumminaro et al. |
| 2002/0057080 A1 | 5/2002 | Telefus et al. |
| 2002/0114172 A1 | 8/2002 | Webb et al. |
| 2002/0167385 A1 | 11/2002 | Ackermann |
| 2003/0026115 A1 | 2/2003 | Miyazaki |
| 2003/0197585 A1 | 10/2003 | Chandrasekaran et al. |
| 2003/0198067 A1 | 10/2003 | Sun et al. |
| 2004/0017689 A1 | 1/2004 | Zhang et al. |
| 2004/0034555 A1 | 2/2004 | Dismukes et al. |
| 2004/0148047 A1 | 7/2004 | Dismukes et al. |
| 2004/0156220 A1 | 8/2004 | Kim et al. |
| 2004/0200631 A1 | 10/2004 | Chen |
| 2004/0217794 A1 | 11/2004 | Strysko |
| 2005/0024179 A1 | 2/2005 | Chandrasekaran et al. |
| 2005/0245658 A1 | 11/2005 | Mehrotra et al. |
| 2005/0281058 A1 | 12/2005 | Batarseh et al. |
| 2006/0006975 A1 | 1/2006 | Jitaru et al. |
| 2006/0038549 A1 | 2/2006 | Mehrotra et al. |
| 2006/0038649 A1 | 2/2006 | Mehrotraa et al. |
| 2006/0038650 A1 | 2/2006 | Mehrotra et al. |
| 2006/0109698 A1 | 5/2006 | Qu |
| 2006/0114095 A1* | 6/2006 | Lee .............................. 336/182 |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0237968 A1 | 10/2006 | Chandrasekaran |
| 2006/0255360 A1 | 11/2006 | Brar et al. |
| 2007/0007945 A1 | 1/2007 | King et al. |
| 2007/0045765 A1 | 3/2007 | Brar et al. |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1 | 5/2007 | Zhang et al. |
| 2007/0159857 A1 | 7/2007 | Lee |
| 2007/0222463 A1 | 9/2007 | Qahouq et al. |
| 2007/0241721 A1 | 10/2007 | Weinstein et al. |
| 2007/0296028 A1 | 12/2007 | Brar et al. |
| 2007/0298559 A1 | 12/2007 | Brar et al. |
| 2007/0298564 A1 | 12/2007 | Brar et al. |
| 2008/0024259 A1* | 1/2008 | Chandrasekaran et al. .. 336/178 |
| 2008/0054874 A1 | 3/2008 | Chandrasekaran et al. |
| 2008/0074227 A1 | 3/2008 | Chen et al. |
| 2008/0111657 A1 | 5/2008 | Mehrotra et al. |
| 2008/0130321 A1 | 6/2008 | Artusi et al. |
| 2008/0130322 A1 | 6/2008 | Artusi et al. |
| 2008/0137381 A1 | 6/2008 | Beasley |
| 2008/0150666 A1 | 6/2008 | Chandrasekaran et al. |
| 2008/0205104 A1 | 8/2008 | Lev et al. |
| 2008/0224812 A1 | 9/2008 | Chandrasekaran |
| 2008/0232141 A1 | 9/2008 | Artusi et al. |
| 2008/0298106 A1 | 12/2008 | Tataeishi |
| 2008/0310190 A1 | 12/2008 | Chandrasekaran et al. |
| 2008/0315852 A1 | 12/2008 | Jayaraman et al. |
| 2008/0316779 A1 | 12/2008 | Jayaraman et al. |
| 2009/0046486 A1 | 2/2009 | Lu et al. |
| 2009/0097290 A1 | 4/2009 | Chandrasekaran |
| 2009/0257250 A1 | 10/2009 | Liu |
| 2009/0273957 A1 | 11/2009 | Feldtkeller |
| 2009/0284994 A1 | 11/2009 | Lin et al. |
| 2009/0302986 A1 | 12/2009 | Bedea |
| 2009/0315530 A1 | 12/2009 | Baranwal |
| 2010/0091522 A1 | 4/2010 | Chandrasekaran et al. |
| 2010/0123486 A1 | 5/2010 | Berghegger |
| 2010/0149838 A1 | 6/2010 | Artusi et al. |
| 2010/0182806 A1 | 7/2010 | Garrity et al. |
| 2010/0188876 A1 | 7/2010 | Garrity et al. |
| 2010/0254168 A1 | 10/2010 | Chandrasekaran |
| 2010/0321958 A1 | 12/2010 | Brinlee et al. |
| 2010/0321964 A1 | 12/2010 | Brinlee et al. |
| 2011/0038179 A1 | 2/2011 | Zhang |
| 2011/0134664 A1 | 6/2011 | Berghegger |
| 2011/0149607 A1 | 6/2011 | Jungreis et al. |
| 2011/0182089 A1 | 7/2011 | Berghegger |
| 2011/0239008 A1 | 9/2011 | Lam et al. |
| 2011/0305047 A1 | 12/2011 | Jungreis et al. |
| 2012/0243271 A1 | 9/2012 | Berghegger |
| 2012/0294048 A1 | 11/2012 | Brinlee |

FOREIGN PATENT DOCUMENTS

| | | |
|---|---|---|
| CN | 201252294 | 6/2009 |
| EP | 0665634 | 1/1994 |
| JP | 57097361 | 6/1982 |
| JP | 58161308 A | 9/1983 |
| JP | 3215911 | 9/1991 |
| JP | 200068132 | 3/2000 |
| WO | WO8700991 | 2/1987 |
| WO | 2004042754 A1 | 5/2004 |
| WO | WO2010083511 | 7/2010 |
| WO | WO2010083514 | 7/2010 |
| WO | WO2010114914 | 10/2010 |
| WO | WO2011116225 | 9/2011 |

OTHER PUBLICATIONS

"AN101A: Gate Drive Network for a Power JFET," AN101A.Rev 1.2, Nov. 2003, 2 pp., Lovoltech, Inc., Santa Clara, CA.

"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.

Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.

Chhawchharia, P., et al., "On the Reduction of Component Count in Switched Capacitor DC/DC Convertors," Hong Kong Polytechnic University, IEEE, 1997, Hung Hom, Kowloon, Hong King, pp. 1395-1401.

Curtis, K., "Advances in Microcontroller Peripherals Facilitate Current-Mode for Digital Power Supplies," Digital Power Forum '06, 4 pp., Sep. 2006, Darnell Group, Richardson, TX.

Eisenbeiser, K., et al., "Manufacturable GaAs VFET for Power Switching Applications," IEEE Electron Device Letters, Apr. 2000, pp. 144-145, vol. 21, No. 4, IEEE.

Freescale Semiconductor, "Implementing a Digital AC/DC Switched-Mode Power Supply using a 56F8300 Digital Signal Controller," Application Note AN3115, Aug. 2005, 24 pp., Chandler, AZ.

Freescale Semiconductor, "56F8323 Evaluation Module User Manual, 56F8300 16-bit Digital Signal Controllers", MC56F8323EVMUM, Rev. 2, Jul. 2005 (72 pages).

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.

Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.

(56) References Cited

OTHER PUBLICATIONS

Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.
Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.
Kollman, R., et al., "10 MHz PWM Converters with GaAs VFETs," IEEE 11th Annual Applied Power Electronics Conference and Exposition, Mar. 1996, pp. 264-269, vol. 1, IEEE.
Kuwabara, K., et al., "Switched-Capacitor DC-DC Converters," Fujitsu Limited, IEEE, 1988, Kawasaki, Japan, pp. 213-218.
Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.
Lenk, R., "Introduction to the Tapped Buck Converter," PCIM 2000, HFPC 2000 Proceedings, Oct. 2000, pp. 155-166.
Liu, W., "Fundamentals of III-V Devices: HBTs, MESFETs, and HFETs/HEMTs," §5-5: Modulation Doping, 1999, pp. 323-330, John Wiley & Sons, New York, NY.
Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.
Maxim, Application Note 725, www.maxim-ic.com/an725, Maxim Integrated Products, Nov. 29, 2001, 8 pages.
Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.
Miwa, B.A., et al., "High Efficiency Power Factor Correction Using Interleaving Techniques," IEEE Proceedings of APEC, 1992, pp. 557-568, IEEE, Los Alamitos, CA.
National Semiconductor Corporation, "LM2665 Switched Capacitor Voltage Converter," www.national.com, Sep. 2005, 9 pages.
National Semiconductor Corporation, "LMC7660 Switched Capacitor Voltage Converter," www.national.com, Apr. 1997, 12 pages.
Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.
Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.
Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.
O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.
Peng, C., et al., "A New Efficient High Frequency Rectifier Circuit," Proceedings of 1991 High Frequency Power Conversion (HFPC '91) Conference, Jun. 1991, pp. 236-243, Toronto, CA.
Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.
Plumton, D.L., et al., "A Low On-Resistance High-Current GaAs Power VFET," IEEE Electron Device Letters, Apr. 1995, pp. 142-144, vol. 16, No. 4, IEEE.
Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.
Rico, M., et al., "Static and Dynamic Modeling of Tapped-Inductor DC-to-DC Converters," 1987, pp. 281-288, IEEE, Los Alamitos, CA.
Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.
Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.
Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.
Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.
Texas Instruments Incorporated, "LT1054, LT1054Y Switched-Capacitor Voltage Converters With Regulators," SLVS033C, Feb. 1990—Revised Jul. 1998, 25 pages.
Thaker, M., et al., "Adaptive/Intelligent Control and Power Management Reduce Power Dissipation and Consumption," Digital Power Forum '06, 11 pp., Sep. 2006, Darnell Group, Richardson, TX.
Vallamkonda, S., "Limitations of Switching Voltage Regulators," A Thesis in Electrical Engineering, Texas Tech University, May 2004, 89 pages.
Wei, J., et al., "Comparison of Three Topology Candidates for 12V VRM," IEEE APEC, 2001, pp. 245-251, IEEE, Los Alamitos, CA.
Weitzel, C.E., "RF Power Devices for Wireless Communications," 2002 IEEE MTT-S CDROM, 2002, pp. 285-288, paper TU4B-1, IEEE, Los Alamitos, CA.
Williams, R., "Modern GaAs Processing Methods," 1990, pp. 66-67, Artech House, Inc., Norwood, MA.
Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.
Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.
Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.
Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.
Xu, P., et al., "A Novel Integrated Current Doubler Rectifier," IEEE 2000 Applied Power Electronics Conference, Mar. 2000, pp. 735-740, IEEE, Los Alamitos, CA.
Xu, P., et al., "Design and Performance Evaluation of Multi-Channel Interleaved Quasi-Square-Wave Buck Voltage Regulator Module," HFPC 2000 Proceedings, Oct. 2000, pp. 82-88.
Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.
Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.
Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.
Zhou, X., et al., "Investigation of Candidate VRM Topologies for Future Microprocessors," IEEE Applied Power Electronics Conference, Mar. 1998, pp. 145-150, IEEE, Los Alamitos, CA.
Chen, W., et al., "Design of High Efficiency, Low Profile, Low Voltage Converter with Integrated Magnetics," Proceedings of 1997IEEE Applied Power Electronics Conference (APEC '97), 1997, pp. 911-917, IEEE, Los Alamitos, CA.
Power Integrations, Inc., TOP200-4/14 TOPSwitch Family Three-terminal Off-line PWM Switch, Internet Citation http://www.datasheet4u.com/.download.php?id+311769, Jul. 1996, XP002524650, pp. 1-16.

* cited by examiner

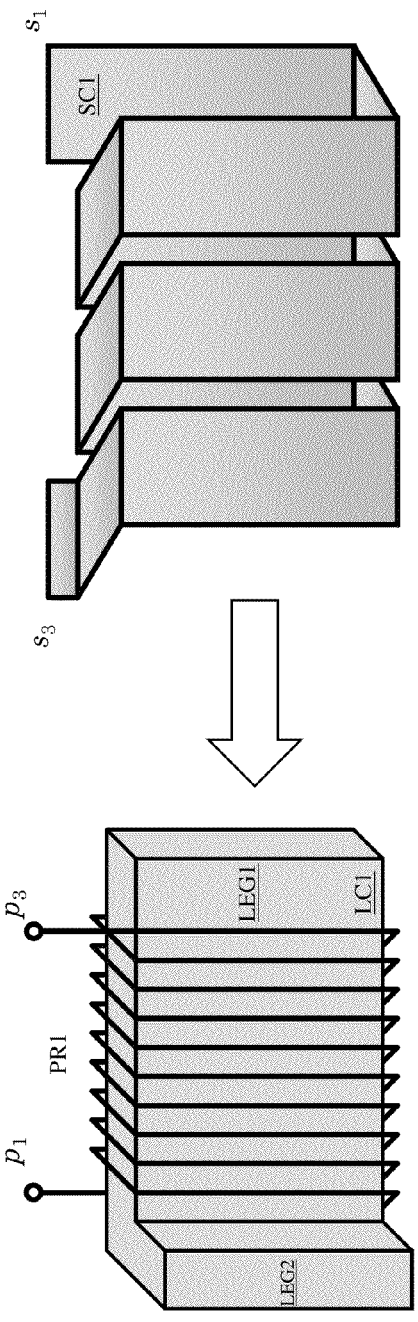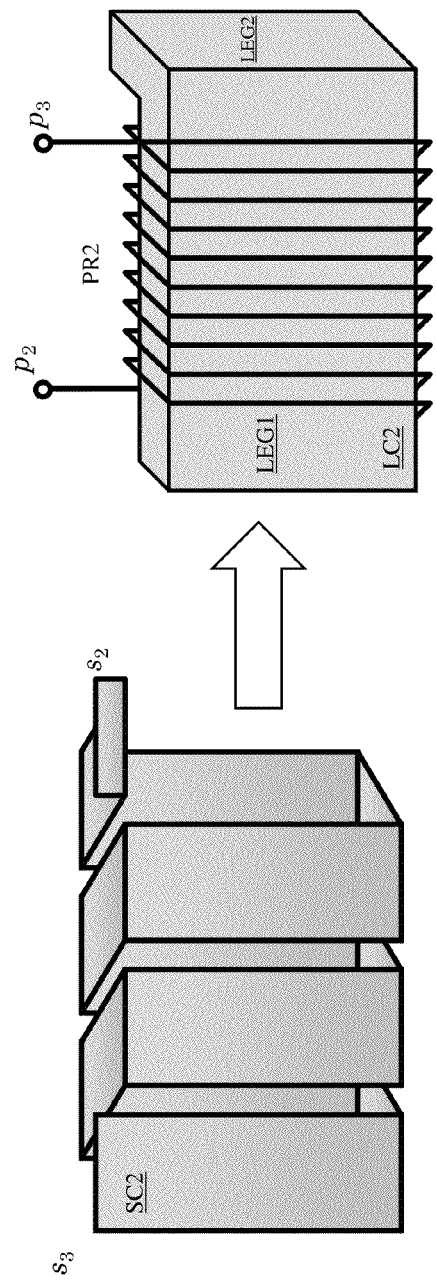
FIGURE 26
FIGURE 27

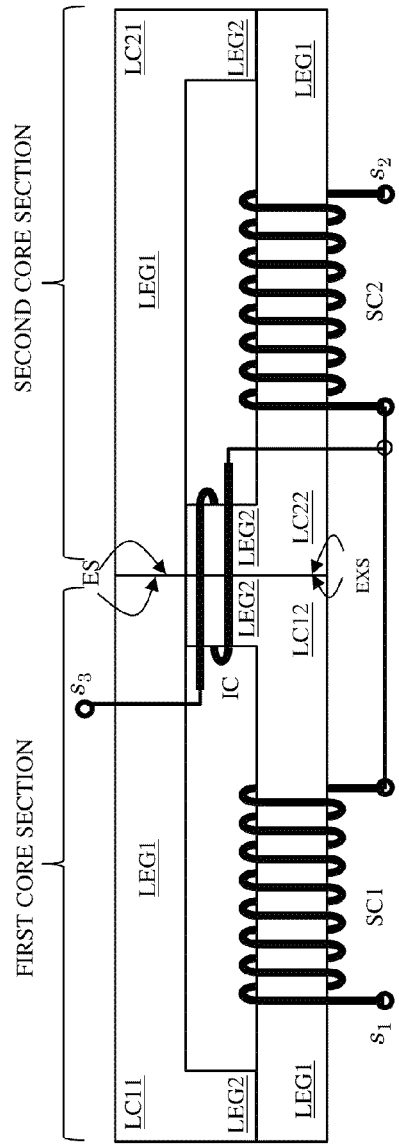
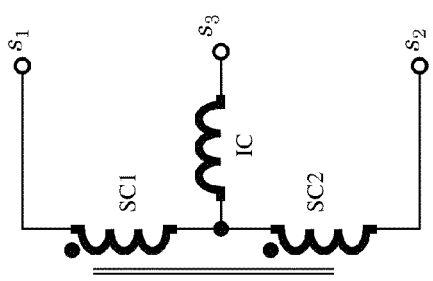
FIGURE 40
FIGURE 41
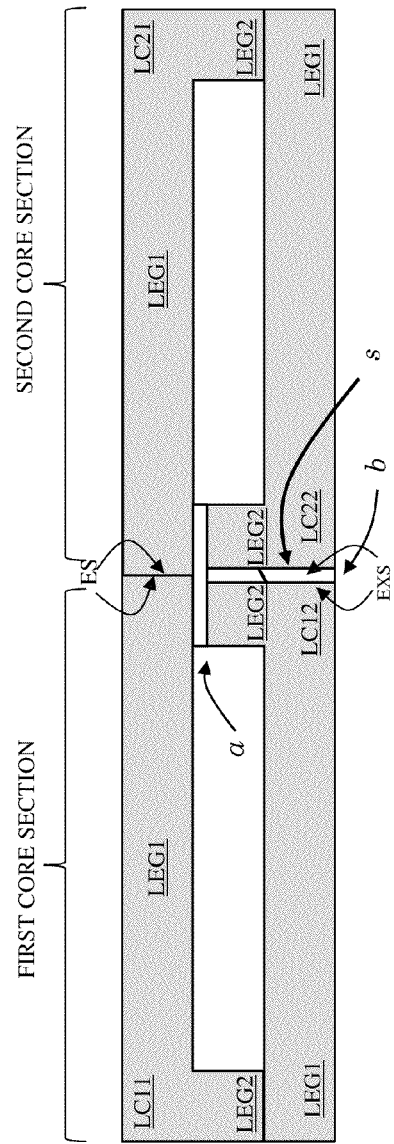
FIGURE 42

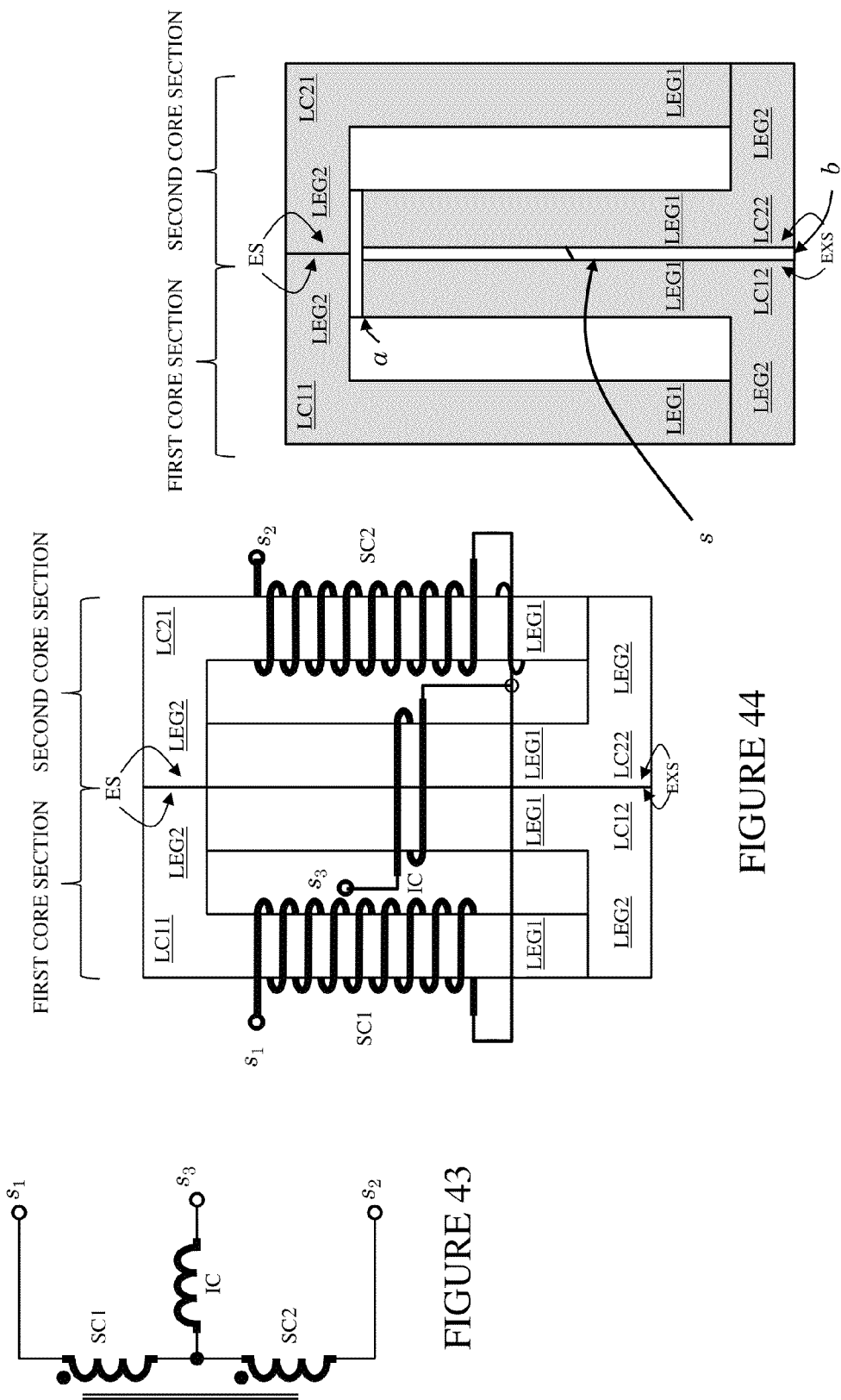

US 9,099,232 B2

MAGNETIC DEVICE AND POWER CONVERTER EMPLOYING THE SAME

TECHNICAL FIELD

The present invention is directed, in general, to power electronics and, more specifically, to a magnetic device and power converter employing the same.

BACKGROUND

A switched-mode power converter (also referred to as a "power converter" or "regulator") is a power supply or power processing circuit that converts an input voltage waveform into a specified output voltage waveform. Magnetic devices such as transformers and inductors are often employed in power converters to store and/or transfer electrical energy through the power converter. Inasmuch as the magnetic devices tend to account for a fair amount of the board space of the power converter and take up disproportional time of the manufacturing process, it is advantageous to employ a compact magnetic device with flexible design. Therefore, what is needed in the art is a building block for a less complex magnetic core amenable to compact magnetic devices.

SUMMARY OF THE INVENTION

Technical advantages are generally achieved, by advantageous embodiments of the present invention, including a magnetic device and power converter employing the same. In one embodiment, the magnetic device includes a first L-core segment including a first leg and a second leg extending therefrom, and an opposing second L-core segment including a first leg and a second leg extending therefrom. The magnetic device also includes a winding formed around at least one of the first leg and the second leg of the first L-core segment or the second L-core segment.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which:

FIGS. 13 to 49 illustrate views of embodiments of magnetic devices.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, magnetic devices employing an L-shaped core, methods of forming the same and power converters employing the magnetic devices. While the principles of the present invention will be described in the environment of a power converter, any application that may benefit from the magnetic devices as described herein including a power amplifier or a motor controller is well within the broad scope of the present invention.

Figure 1:
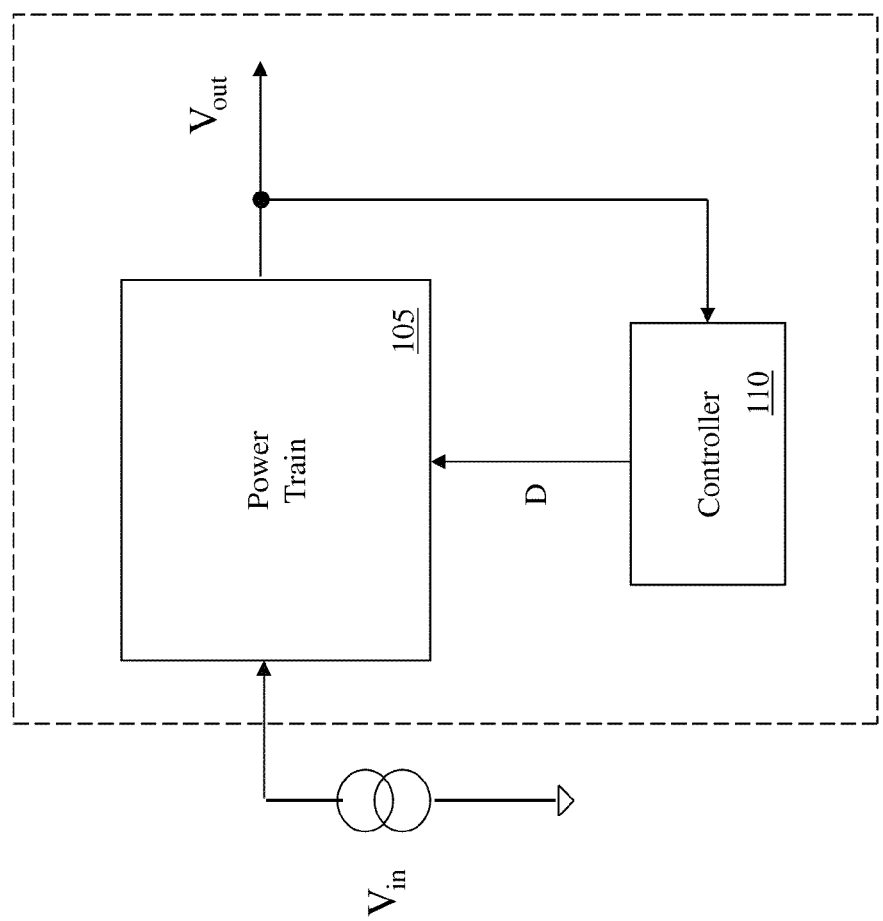
FIG. 1 illustrates a block diagram of an embodiment of a power converter.

Referring initially to FIG. 1, illustrated is a block diagram of an embodiment of a power converter. The power converter is coupled to a source of electrical power such as an ac mains for providing an ac input voltage $V_{in}$. The power converter includes a power train 105 that is controlled by a controller 110. The controller 110 generally measures an operating characteristic of the power converter such as an output voltage $V_{out}$ and controls a duty cycle (generally designated "D") of a switch therein in response to the measured operating characteristic to regulate the characteristic. The power converter may form a section of a power supply and provide power to another subsystem thereof, such as an isolating dc-to-dc converter coupled to an output thereof that provides a regulated voltage to a load. The power train 105 may employ a regulator (e.g., a boost or buck regulator) as described herein. The power train 105 of the power converter generally includes a plurality of switches coupled to reactive circuit elements to provide the power conversion function.

Figure 2:
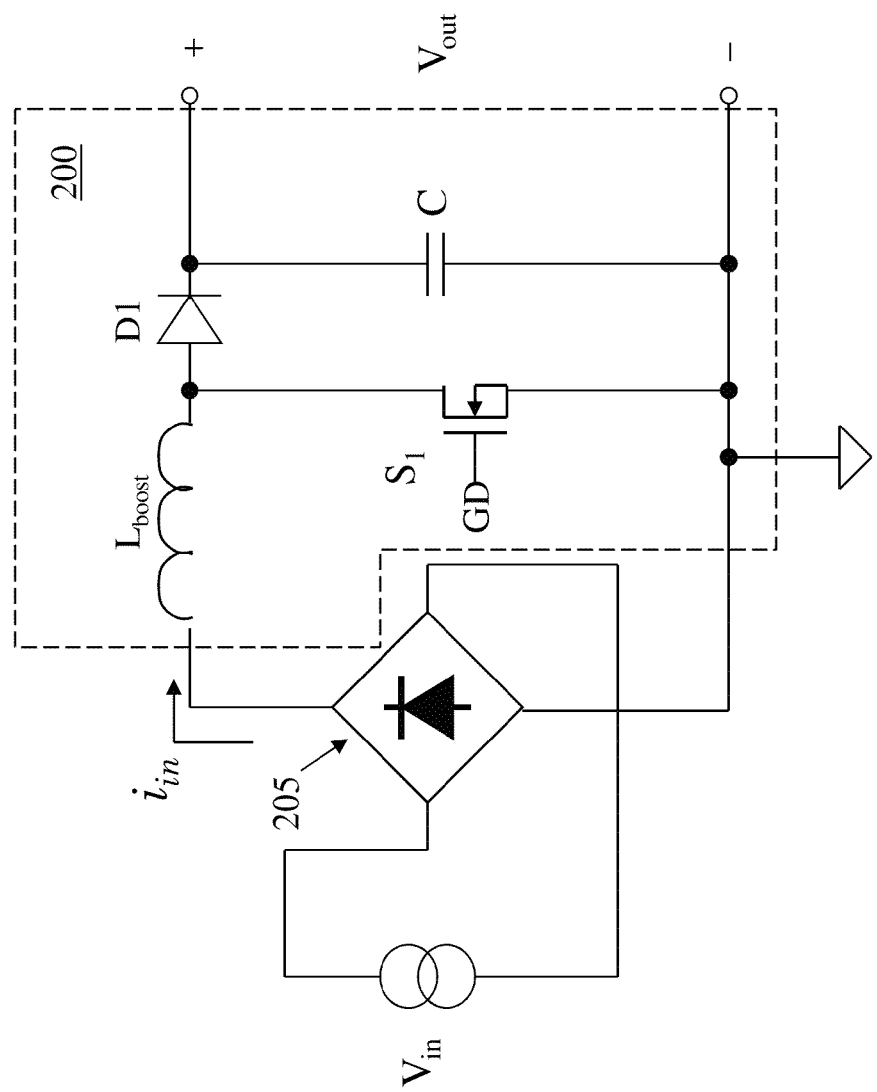
FIGS. 2 and 3 illustrate schematic diagrams of exemplary power trains of a power converter employing a boost regulator.
Figure 3:
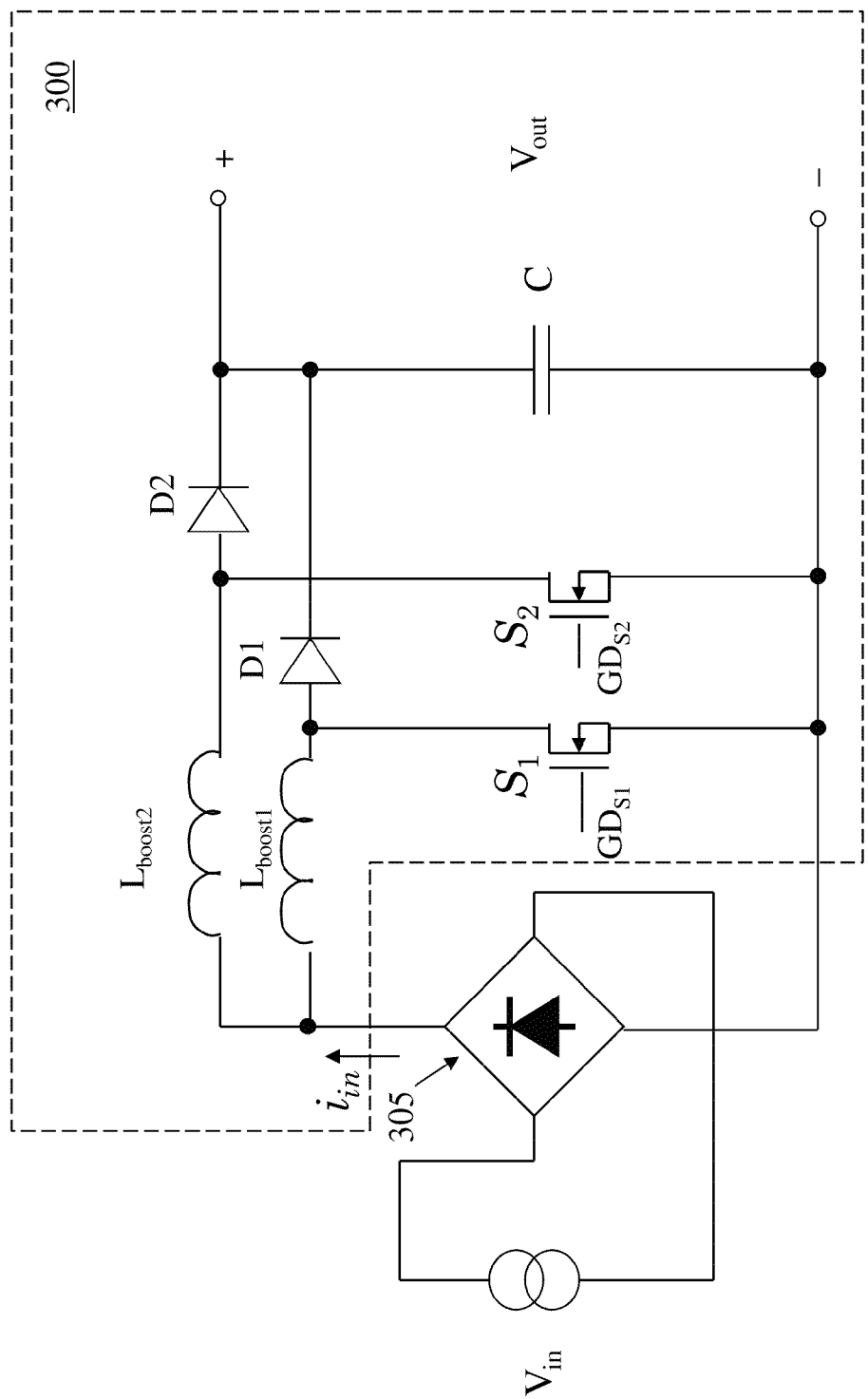

Turning now to FIGS. 2 and 3, illustrated are schematic diagrams of exemplary power trains of a power converter employing a boost regulator. Beginning with FIG. 2, illustrated is a power train 200 employing a boost regulator. The power converter receives an input voltage $V_{in}$ (e.g., an unregulated ac input voltage) from a source of electrical power such as an ac mains at an input thereof and provides a regulated output voltage $V_{out}$ at an output of the power converter. In keeping with the principles of a boost topology, the output voltage $V_{out}$ is generally higher than the input voltage $V_{in}$ such that a switching operation thereof can regulate the output voltage $V_{out}$. A main switch $S_1$ (e.g., an N-channel metal-oxide semiconductor "active" switch) of the boost regulator is enabled to conduct by a gate drive signal GD for a primary interval D and couples the input voltage $V_{in}$ through a rectifier bridge 205 to a boost inductor $L_{boost}$. During the primary interval D, a rectified input current or input current flows through the boost inductor $L_{boost}$ to local circuit ground.

The duty cycle for the power train 200 depends in steady state, under continuous current in the boost inductor $L_{boost}$, on the ratio of the input and output voltages $V_{in}$, $V_{out}$, respectively, according to the equation:

$$D = 1 - \frac{V_{in}}{V_{out}}.$$

During a complementary interval 1-D, the main switch $S_1$ is transitioned to a non-conducting state and an auxiliary switch (e.g., a diode D1) conducts. In an alternative circuit arrangement, the auxiliary switch may include a second active switch that is controlled to conduct by a complementary gate drive signal. The diode D1 provides a path to maintain continuity of the input current $i_{in}$ flowing through the boost inductor $L_{boost}$. During the complementary interval 1-D, the input current $i_{in}$ flowing through the boost inductor $L_{boost}$ decreases, and may become zero and remain zero for a period of time resulting in a "discontinuous conduction mode" of operation.

During the complementary interval 1-D, the current flowing through the boost inductor $L_{boost}$ flows through the diode D1 into an output filter capacitor C. In general, the duty cycle of the main switch $S_1$ (and the complementary duty cycle of the diode D1) may be adjusted to maintain a regulation of the output voltage $V_{out}$ of the power converter. The conduction periods for the main and auxiliary switches may be substantially equal or varied to maintain a regulation of the output voltage $V_{out}$ of the power converter. Those skilled in the art understand that conduction periods for the main and auxiliary switches may be separated by a small time interval by the use of "snubber" circuit elements (not shown) or by control circuit timing to avoid cross conduction current therebetween, and beneficially to reduce the switching losses associated with the power converter. Circuit and control techniques to avoid cross conduction currents between switches are well understood in the art and will not be described further in the interest of brevity.

Turning now to FIG. 3, illustrated is an exemplary power train 300 of a power converter employing first and second boost regulators coupled to first and second boost inductors $L_{boost1}$, $L_{boost2}$, respectively. The first boost regulator includes a first main switch S1 and a first auxiliary switch (e.g., a first diode D1). The second boost regulator includes a second main switch S2 and a second auxiliary switch (e.g., a second diode D2). The first and second main switches S1, S2 receive first and second gate drive signals $GD_{S1}$, $GD_{S2}$, respectively, generally controlled to operate roughly 180 degrees out of phase with respect to each other. Out-of-phase operation of the boost regulators provides an interleaving effect that doubles the ripple frequency and reduces the ripple magnitude for an ac input current delivered to a rectifier bridge 305. The rectifier bridge 305 provides a rectified input current or input current $i_{in}$. A similar effect is achieved for the current supplied to an output filter capacitor C. The reduction of switching ripple in the ac input current helps reduce filtering requirements for an input filter (not shown) to reduce undesirable high-frequency components. Although substantial benefits can accrue from the interleaving effects between two boost regulators, the design challenges previously described to implement efficient boost inductors still remain. Remaining circuit elements in FIG. 3 and in following FIGUREs that are similar to those in FIG. 2 and other FIGUREs will not generally be described again in the interest of brevity.

Figure 4:
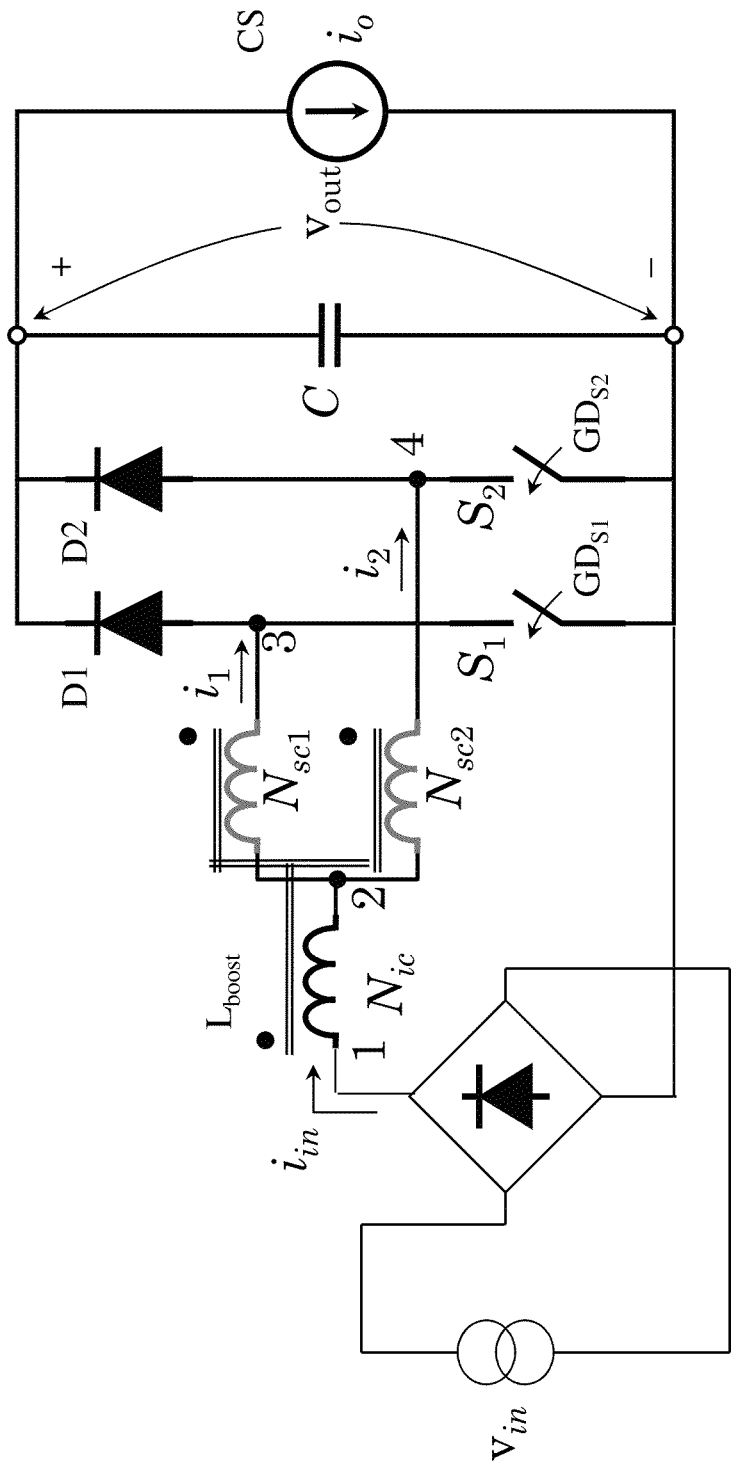
FIGS. 4 and 5 illustrate schematic diagrams of embodiments of portions of power converters.
Figure 5:
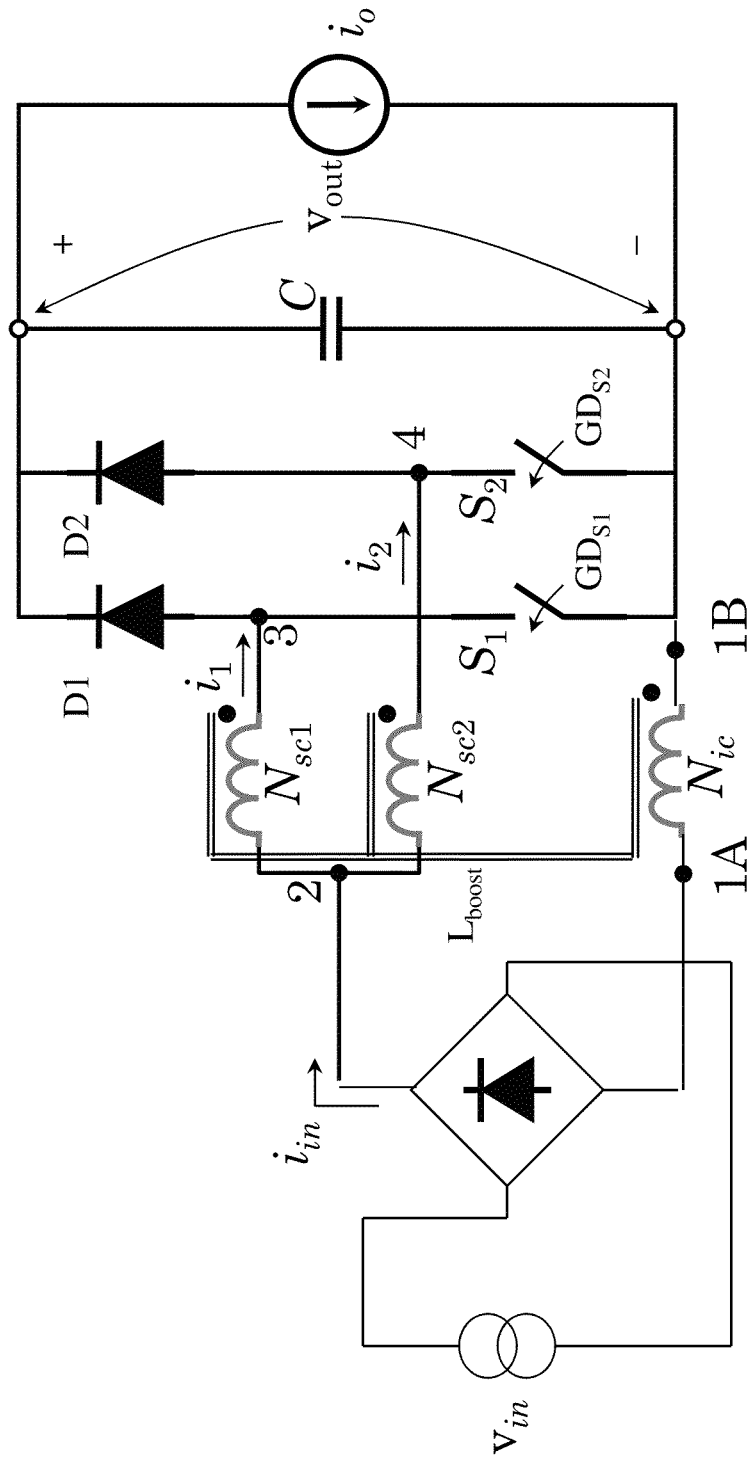

Turning now to FIGS. 4 and 5, illustrated are schematic diagrams of embodiments of portions of power converters. More specifically, FIG. 4 illustrates a power train employing a boost topology with two interleaved boost regulators (e.g., first and second boost regulators) and a coupled boost inductor $L_{boost}$. It should be understood, however, that other topologies such as a buck topology with interleaved regulators (e.g., first and second regulators) and a coupled inductor as described herein are well within the broad scope of the present invention. The coupled boost inductor $L_{boost}$ includes a common winding $N_{ic}$ (coupled between nodes 1 and 2), a first winding $N_{sc1}$ (coupled between nodes 2 and 3), and a second winding $N_{sc2}$ (coupled between nodes 2 and 4). The first and second windings $N_{sc1}$, $N_{sc2}$ are electrically and magnetically coupled to the common winding $N_{ic}$. In an advantageous embodiment, the first and second windings $N_{sc1}$, $N_{sc2}$ have equal numbers of turns and will hereinafter be represented with a reference symbol $N_S$. Dots are illustrated in the FIGURE adjacent to the windings to indicate the sense of each winding (i.e., the winding direction and the sense of the magnetically induced voltage therein).

In an advantageous embodiment, the interleaved boost regulators are controlled to provide an input current with high-power factor. The first boost regulator includes a first main switch (e.g., a field-effect transistor) $S_1$ and a first auxiliary switch (e.g., a first diode D1), and is coupled to a portion of the coupled boost inductor $L_{boost}$ including the common winding $N_{ic}$ and the first winding $N_{sc1}$. The second boost regulator includes a second main switch (e.g., a field-effect transistor) $S_2$ and a second auxiliary switch (e.g., a second diode D2), and is coupled to a portion of the coupled boost inductor $L_{boost}$ including the common winding $N_{ic}$ and the second winding $N_{sc2}$. The output currents from the boost regulators of the power train are interleaved and flow through the first and second diodes D1, D2 into an output filter capacitor C. Similarly, the rectified input current or input current $i_{in}$ to the boost regulators are interleaved and flow through the common winding $N_{ic}$. The first and second main switches $S_1$, $S_2$ are controlled by control signals $GD_{S1}$, $GD_{S2}$, respectively, to provide duty-cycle control for each of the two interleaved boost regulators. Typically, the control signals $GD_{S1}$, $GD_{S2}$ are controlled 180 degrees out of phase with respect to each other, and provide a common duty cycle (generally designated "D") for each boost regulator. It is also possible for the control signals $GD_{S1}$, $GD_{S2}$ to be independently controlled to provide two distinct duty cycles to ensure that the inductor currents $i_1$, $i_2$ are equal. A load, represented by current source CS, is coupled to output terminals of the power converter and draws a current $i_o$.

A common winding $N_{ic}$ with selected turns can be formed around a common leg (e.g., a center leg) of a magnetic core of the coupled boost inductor $L_{boost}$. In an alternative embodiment, the common winding $N_{ic}$ with selected turns may be formed around a common leg of a magnetic core that is not geometrically a center leg. Thus, the term common leg may include a leg of a magnetic core that may not be geometrically located as a center leg. (See, e.g., U.S. Pat. No. 8,125,205, entitled "Power Converter Employing Regulators with a Coupled Inductor," issued on Feb. 28, 2012, to Chandrasekaran, et al., which is incorporated herein by reference.)

With respect to FIG. 5, illustrated is a schematic diagram of an alternative embodiment of a power converter with a power train having two interleaved boost regulators utilizing a couple boost inductor $L_{boost}$. Again, other topologies such as a buck-boost topology with interleaved regulators (e.g., first and second regulators) and a coupled inductor as described herein are well within the broad scope of the present invention. The couple boost inductor $L_{boost}$ includes a common winding $N_{ic}$ between nodes 1A and 1B, coupled to node 2 thereof in a return leg of the boost regulator that is coupled to the source of electrical power for providing an input voltage $V_{in}$. A first winding $N_{sc1}$ of the couple boost inductor $L_{boost}$ is coupled between nodes 2 and 3, and a second winding $N_{sc2}$ is coupled between node 2 and node 4. The first and second windings $N_{sc1}$, $N_{cs2}$ are magnetically coupled to the common winding $N_{ic}$ and are electrically coupled to the common winding $N_{ic}$. The operation of the power converter illustrated in FIGS. 4 and 5 is substantially similar. Remaining elements in FIG. 5 with reference designations corresponding to those in FIG. 4 are substantially the same and will not be redescribed in the interest of brevity.

In a further alternative embodiment of the couple boost inductor $L_{boost}$, the first and second windings $N_{sc1}$, $N_{sc2}$ can be electrically coupled together external to the magnetic device forming a portion of the couple boost inductor $L_{boost}$. In a further alternative embodiment of the couple boost inductor $L_{boost}$, the common winding $N_{ic}$ can be separated into two winding parts, each part coupled in the power converter as indicated in FIGS. 4 and 5 for the respective winding.

Figure 6:
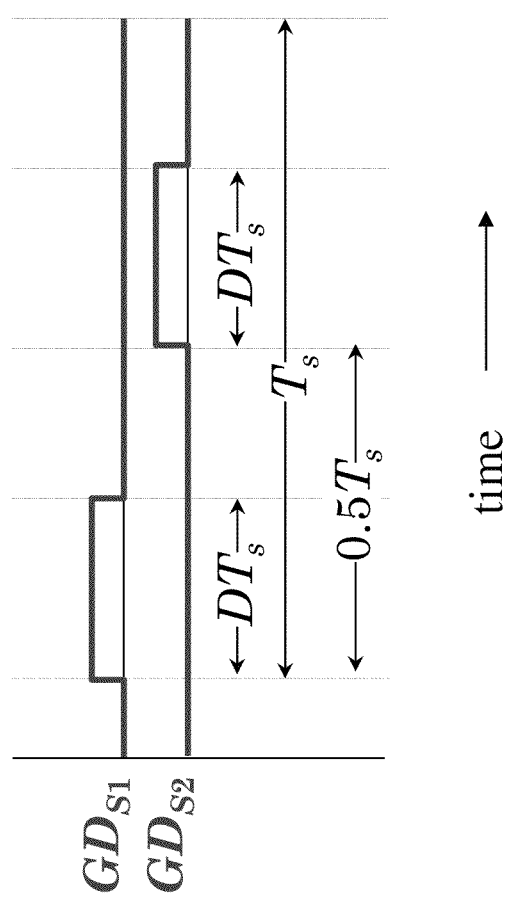
FIG. 6 illustrates a timing diagram demonstrating an operation of the power converter of FIGS. 4 and 5.

Turning now to FIG. 6, illustrated is a timing diagram demonstrating an operation of the power converter of FIGS. 4 and 5. The period of a switching cycle is represented by the variable $T_S$. The periods when the first and second main switches $S_1$, $S_2$ are enabled to conduct are represented by the quantity $D\,T_s$, which is assumed to be the same interval of time therefor. The first and second main switches $S_1$, $S_2$ are operated 180 degrees out of phase by a delay $0.5 \cdot T_S$ as shown in FIG. 6.

Figure 7:
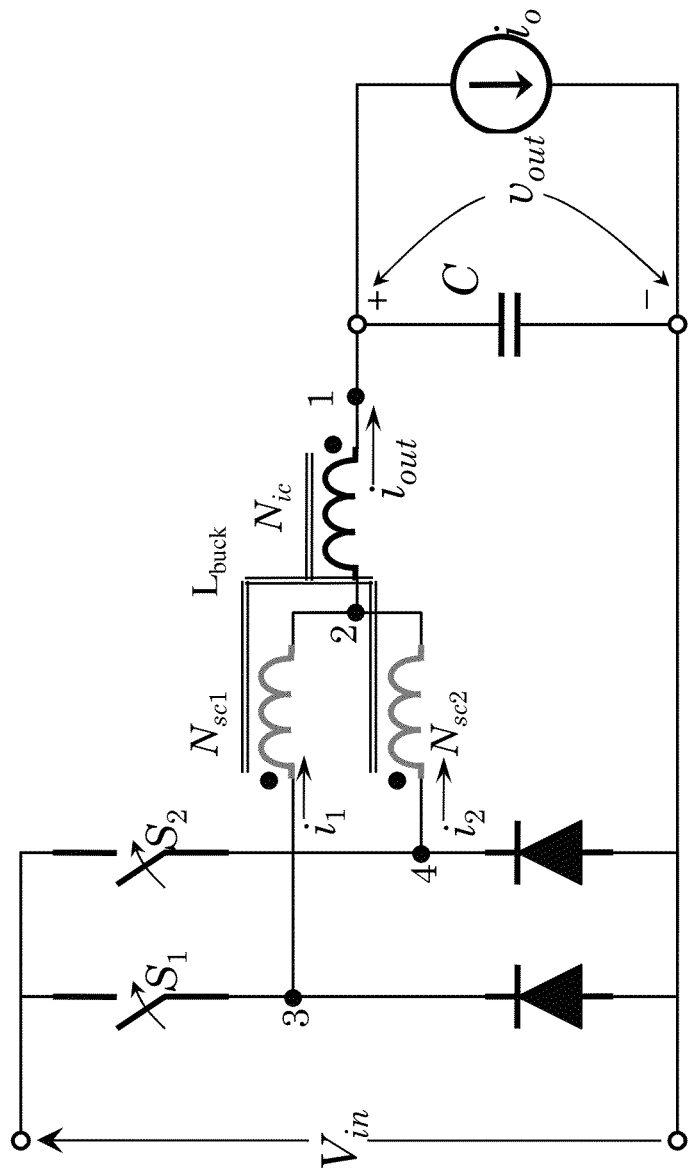
FIGS. 7 and 8 illustrate schematic diagrams of alternative embodiments of portions of power converters.
Figure 8:
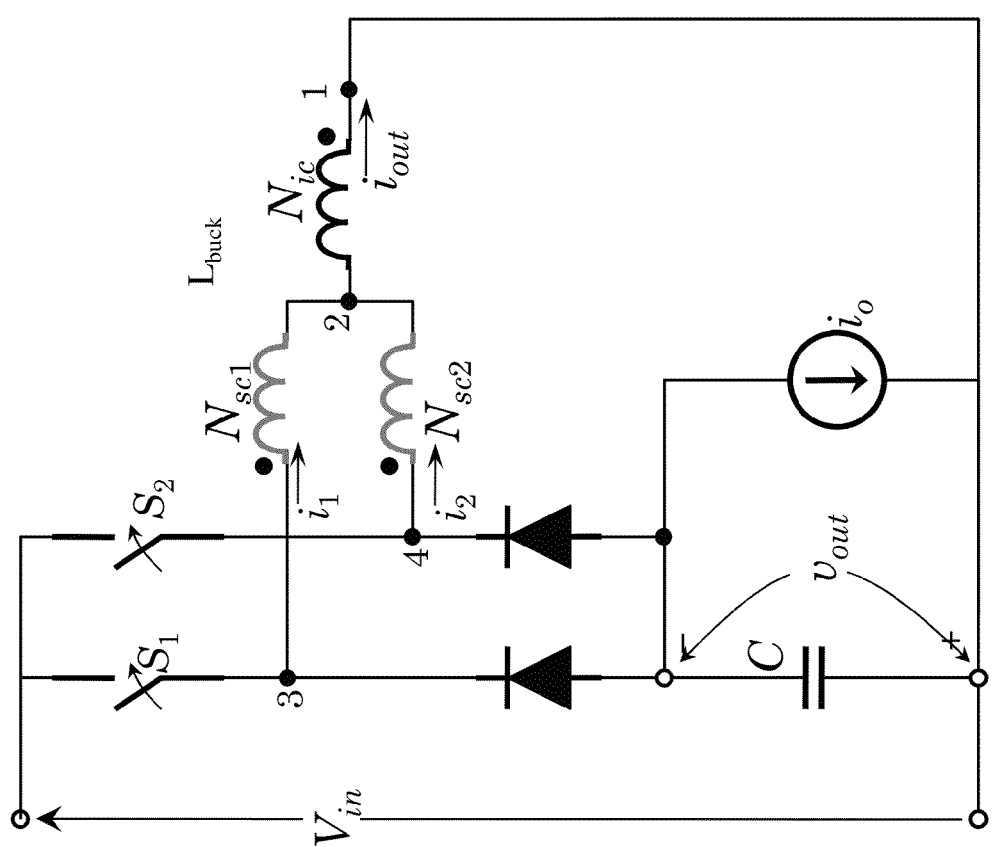

Turning now to FIGS. 7 and 8, illustrated are schematic diagrams of alternative embodiments of portions of power converters. More specifically, FIG. 7 illustrates a power converter employing buck regulators with a coupled inductor. FIG. 8 illustrates a power converter employing buck-boost regulators with a coupled inductor. While the operation of the power converters of FIGS. 7 and 8 differs to accommodate the buck and buck-boost operation, respectively, the principles of the present invention with respect to the interleaved regulators and coupled inductor are analogous to the principles as described above and will not hereinafter be repeated.

Figure 9:
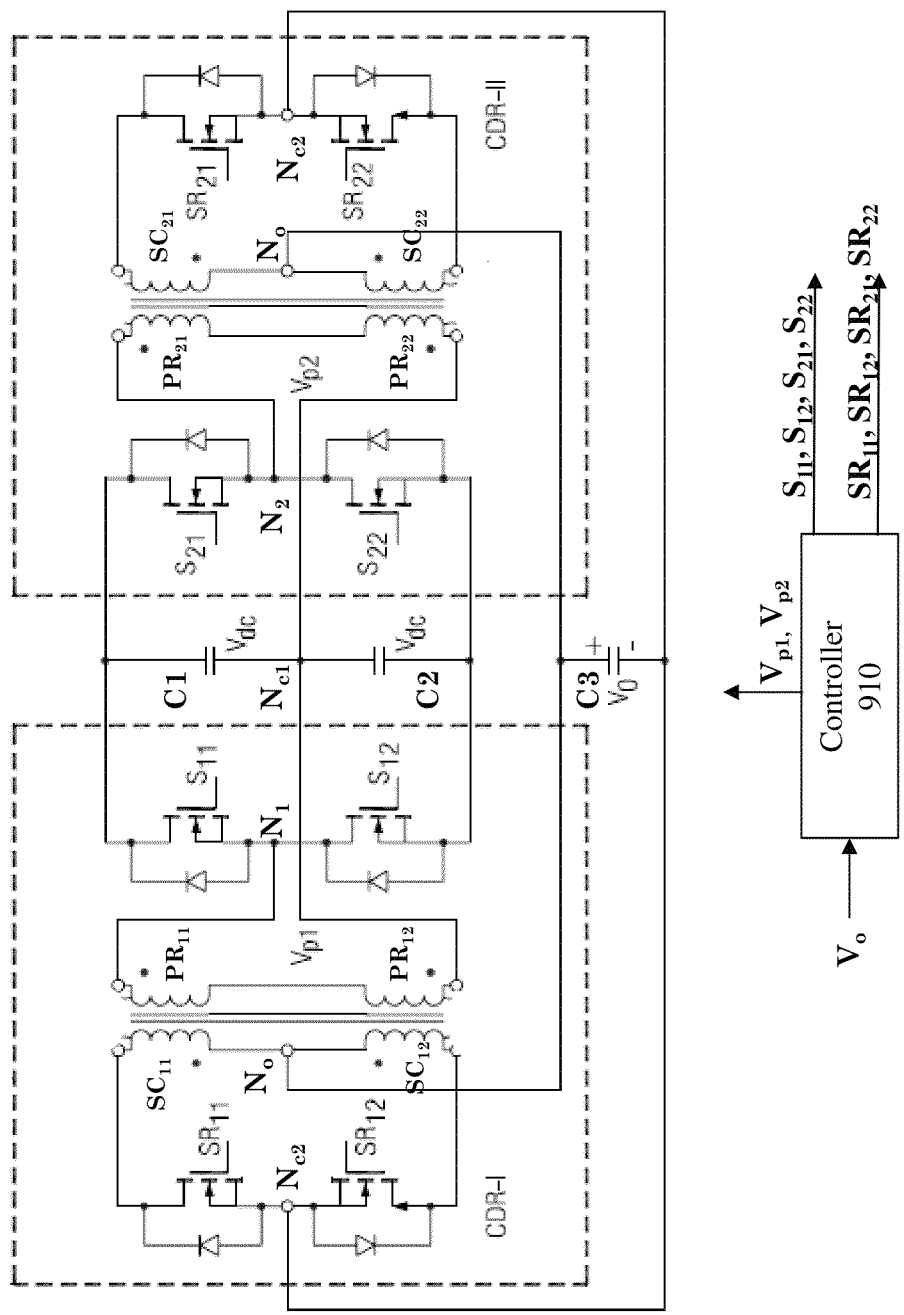
FIG. 9 illustrates a schematic diagram of an alternative embodiment of a power converter.

Turning now to FIG. 9, illustrated is a schematic diagram of an alternative embodiment of a power converter. The power converter includes two interleaved half-bridge, isolated current double rectifiers (designated "CDR-I" and "CDR-II"). The power converter is operated by applying an ac input voltage through a source of electrical power through a bridge rectifier (not shown) to provide a dc input voltage $V_{dc}$ to respective primary windings. The dc input voltage $V_{dc}$ is connected across a first series-connected pair of switches $S_{11}$, $S_{12}$, and across a second series-connected pair of switches $S_{21}$, $S_{22}$. The first series-connected pair of switches $S_{11}$, $S_{12}$ are connected together at a first node $N_1$, and the second series-connected pair of switches $S_{21}$, $S_{22}$ are connected together at a second node $N_2$. The first and second series-connected pair of switches $S_{11}$, $S_{12}$, $S_{21}$, $S_{22}$ are preferably field-effect transistors, each having a parasitic diode connected thereacross. The dc input voltage $V_{dc}$ is also connected across a pair of capacitors C1, C2, which are connected together at a first common node $N_{c1}$. The first and second series-connected pair of switches $S_{11}$, $S_{12}$, $S_{21}$, $S_{22}$ are operated with a controller 910 to generate a first drive voltage $V_{p1}$ between the first node $N_1$ and the first common node $N_{c1}$, and a second drive voltage $V_{p2}$ between the second node $N_2$ and the first common node $N_{c1}$.

The first interleaved half-bridge, isolated current double rectifier CDR-I includes two series-connected primary windings $PR_{11}$, $PR_{12}$, which are connected across the first node $N_1$ and the first common node $N_{c1}$ and thus are driven with the first drive voltage $V_{p1}$. A pair of secondary windings $SC_{11}$, $SC_{12}$ are connected together at an output node $N_o$, and are magnetically coupled to the primary windings $PR_{11}$, $PR_{12}$, respectively. A pair of series-connected synchronous rectifier switches $SR_{11}$, $SR_{12}$ are connected in parallel with secondary windings $SC_{11}$, $SC_{12}$, respectively, and connected together at a second common node $N_{c2}$. Similarly, the second interleaved half-bridge, isolated current double rectifier CDR-II includes two series-connected primary windings $PR_{21}$, $PR_{22}$, which are connected across the second node $N_2$ and the first common node $N_{c1}$ and thus are driven with the second drive voltage $V_{p2}$. A pair of secondary windings $SC_{21}$, $SC_{22}$ are connected together at an output node $N_o$, and are magnetically coupled to the primary windings $PR_{21}$, $PR_{22}$, respectively. A pair of series-connected synchronous rectifier switches $SR_{21}$, $SR_{22}$ are connected in parallel with secondary windings $SC_{21}$, $SC_{22}$, respectively, and connected together at the second common node $N_{c2}$. The synchronous rectifier switches $SR_{11}$, $SR_{12}$, $SR_{21}$, $SR_{22}$ are preferably field-effect transistors, each having a parasitic diode connected thereacross. Alternatively, the synchronous rectifier switches $SR_{11}$, $SR_{12}$, $SR_{21}$, $SR_{22}$ can be replaced with diodes and oriented in a similar manner to the parasitic diodes. An output filter capacitor C3 is connected between the output node $N_o$ and the second common node $N_{c2}$, wherein an output voltage $V_o$ is to be provided to a load coupled thereto.

The ac input voltages are generated in accordance with the symmetric modulation scheme. In accordance therewith, the drive voltages applied to respective current doubler rectifiers are phase-shifted with respect to each other by $T_s/(2*N)$, wherein $T_s$ is the drive voltages' switching period and N is the number of current doubler rectifiers. For the illustrated power converter with N=2, the controller 910 operates the switches $S_{11}$, $S_{12}$, $S_{21}$, $S_{22}$ such that the first and second drive voltages $V_{p1}$, $V_{p2}$ are phase-shifted by one-fourth the switching period $T_s$, which ensures that the rectified output currents of the two current doubler rectifiers are interleaved. The controller 910 also provides the signals needed to operate the synchronous rectifier switches $SR_{11}$, $SR_{12}$, $SR_{21}$, $SR_{22}$. The controller 910 operates the aforementioned switches in accordance with the output voltage $V_o$ of the power converter. (See, e.g., U.S. Pat. No. 7,046,523, entitled "Core Structure and Interleaved DC-DC Converter Topology," issued on May 16, 2006, to Sun, et al. and U.S. Pat. No. 8,134,443, entitled "Extended E Matrix Integrated Magnetic (MIM) Core," issued on Mar. 13, 2012, to Chandrasekaran, et al., which are incorporated herein by reference.)

Figure 10:
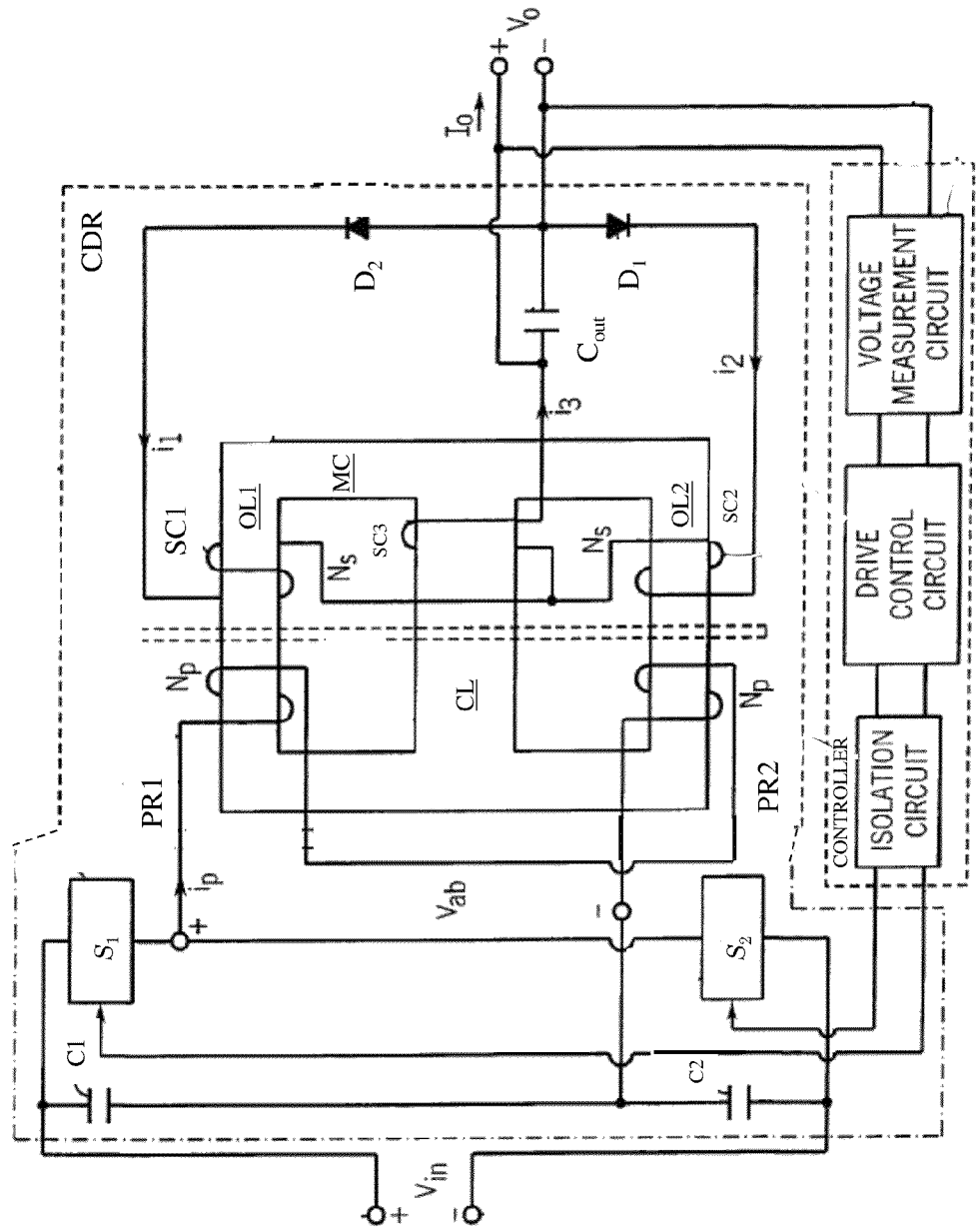
FIG. 10 illustrates a schematic diagram of an alternative embodiment of a power converter.

Turning now to FIG. 10, illustrated is a schematic diagram of an alternative embodiment of a power converter. The power converter includes a current doubler rectifier ("CDR") and a controller. The current doubler rectifier employs a double-ended, half-bridge topology which is capable of applying positive, negative, and zero voltages thereacross. The current doubler rectifier includes first and second capacitors C1, C2, and first and second switches $S_1$, $S_2$. The first and second capacitors C1, C2 and the first and second switches $S_1$, $S_2$ receive a dc input voltage $V_{in}$. The first and second capacitors C1, C2 may, for example, be electrolytic tantalum capacitors and the first and second switches $S_1$, $S_2$ may be metal-oxide semiconductor field-effect transistors.

The current doubler rectifier includes a magnetic device with a magnetic core MC, a primary winding (designated "$N_p$") and a secondary winding (designated "$N_s$"). The current doubler rectifier also includes an output filter capacitor $C_{out}$, and first and second rectifier diodes $D_1$, $D_2$. The magnetic core MC includes a center leg CL, a first outer leg OL1 and a second outer leg OL2. The first and second outer legs OL1, OL2 are disposed on opposite sides of the center leg CL. The primary winding $N_p$ includes a first primary winding PR1 that is formed around the first outer leg OL1 and a second primary winding PR2 formed around the second outer leg OL2. The secondary winding $N_s$ includes first, second and third secondary winding SC1, SC2, SC3 formed around the first outer leg OL1, the second outer leg OL2 and the center leg CL, respectively. The duty cycle of the first and second switches $S_1$, $S_2$ is controlled so as to reduce a deviation of an output voltage $V_o$ from a predetermined setpoint level.

In addition to controlling the duty cycle of the first and second switches $S_1$, $S_2$, a controller may also control the output rectifiers when the first and second rectifier diodes $D_1$, $D_2$ are replaced with active switches (e.g., synchronous rectifier switches). The controller includes an isolation circuit (e.g., a transformer) that provides electrical isolation between the components on either side of the magnetic device.

In operation, the input voltage $V_{in}$ is applied to the first and second capacitors C1, C2 and the first and second switches $S_1$, $S_2$. The first and second switches $S_1$, $S_2$ are controlled by a drive control circuit of the controller in a complementary way. The first and second switches $S_1$, $S_2$ apply an ac voltage $V_{ab}$ to the primary winding $N_p$ leading to a first current $i_1$ through the first secondary winding SC1, a second current $i_2$ through the second secondary winding SC2 and a third current $i_3$ through the third secondary winding SC3 (where $i_1+i_2=i_3$). The first and second currents $i_1$, $i_2$ are rectified by the first and second rectifier diodes $D_1$, $D_2$, respectively. The third current $i_3$ charges the output filter capacitor $C_{out}$, which then provides power to a load coupled to the output of the power converter. (See, e.g., U.S. Pat. No. 6,549,436, entitled "Integrated Magnetic Converter Circuit and Method with Improved Filtering," issued on Apr. 15, 2003, to Sun, which is incorporated herein by reference.)

Figure 11:
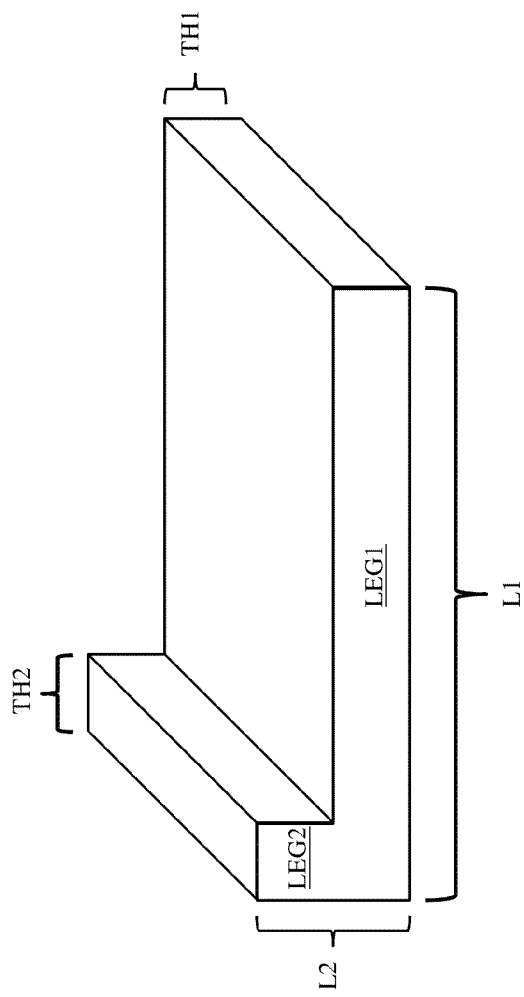
FIG. 11 illustrates perspective view of an embodiment of a portion of a magnetic device.

Turning now to FIG. 11, illustrated is perspective view of an embodiment of a portion of a magnetic device. In particular, an L-core segment is illustrated having a first leg LEG1 and a second leg LEG2. The first leg LEG1 has a length L1 and a thickness TH1 and the second leg LEG2 has a length L2 and a thickness TH2. In an illustrated embodiment, the length L1 of the first leg LEG1 is elongated (i.e., extended or longer) with respect to the length L2 of the second leg LEG2 (e.g., L1≠L2) and the second leg LEG2 is substantially perpendicular to the first leg LEG1. It should be understood, however, that the first and second legs LEG1, LEG2 may be substantially the same length (e.g., L1=L2) and the second leg LEG2 may extend from the first leg LEG1 at different angles. While the first and second legs LEG1, LEG2 are illustrated having the same thickness (e.g., TH1=TH2), it is contemplated that the thickness of the legs may be different (e.g., TH1≠TH2). The L-core segment provides a less complex magnetic core amenable to compact magnetic devices. The L-core segment also provides a structure that allows windings to be formed thereabout without a bobbin. Additionally, the L-core segment can be used as a building block for multiple magnetic core geometries and magnetic device assemblies.

Figure 12:
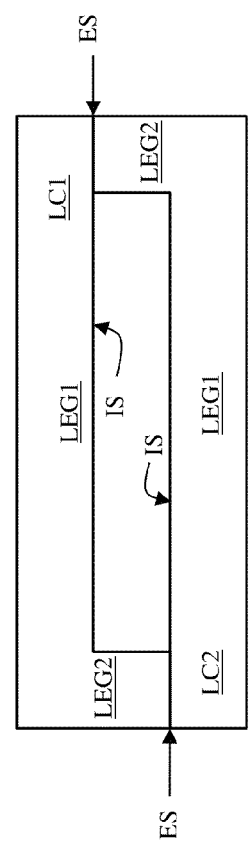
FIG. 12 illustrates a side view of an embodiment of a portion of a magnetic device.

Turning now to FIG. 12, illustrated is a side view of an embodiment of a portion of a magnetic device. A magnetic core of the magnetic device includes a first L-core segment LC1 and an opposing second L-core segment LC2. The first L-core segment LC1 includes a first leg LEG1 and a second leg LEG2 extending therefrom. The second L-core segment LC2 includes a first leg LEG1 and a second leg LEG2 extending therefrom. An end surface ES of the second leg LEG2 of the first L-core segment LC1 mates with (e.g., glued, adhesively secured or banded together) a portion of an internal surface IS of the first leg LEG1 of the second L-core segment LC2. Also, an end surface ES of the second leg LEG2 of the second L-core segment LC2 mates with (e.g., glued, adhesively secured or banded together) a portion of an internal surface IS of the first leg LEG1 of the first L-core segment LC1. The first and second L-core segments LC1, LC2 may be designed with the flexibility as described above with respect to FIG. 11.

Figure 13:
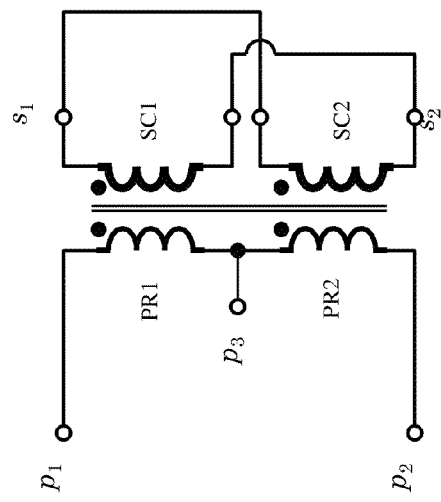
Figure 14:
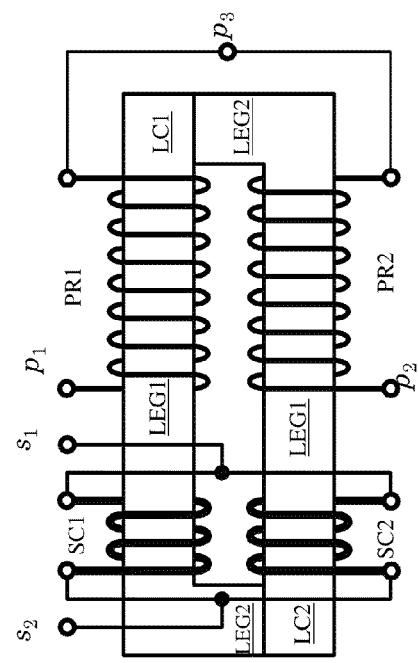
Figure 15:
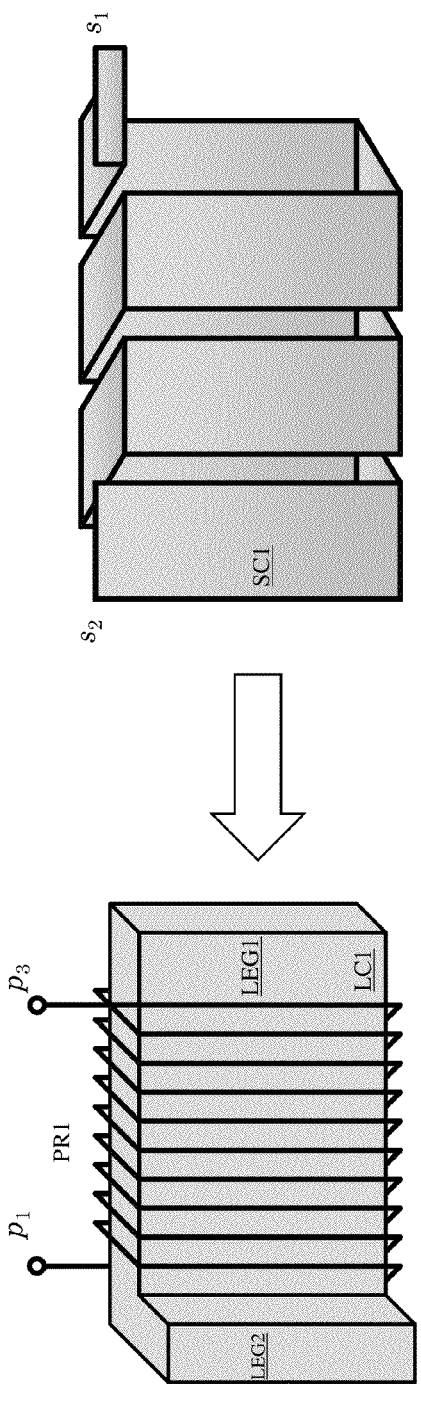
Figure 16:
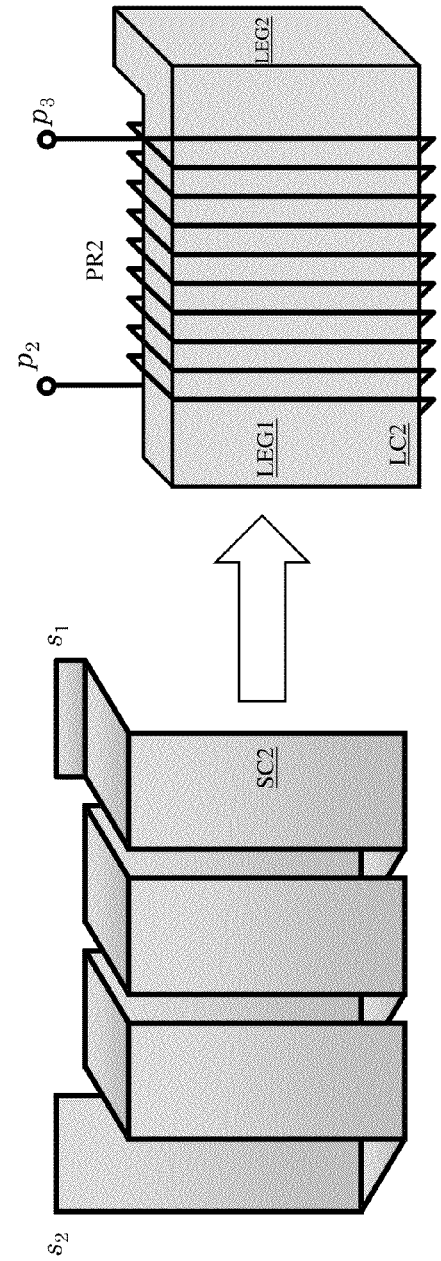

Turning now to FIGS. 13 to 16, illustrated are views of an embodiment of a magnetic device. FIGS. 13 and 14 illustrate a schematic view and a side view, respectively, of the magnetic device having primary windings coupled in series and secondary windings coupled in parallel around a magnetic core. FIGS. 15 and 16 illustrate partially assembled perspective views of the magnetic device. The magnetic core of the magnetic device includes a first L-core segment LC1 and an opposing second L-core segment LC2. The first L-core segment LC1 includes a first leg LEG1 and a second leg LEG2 extending therefrom. The second L-core segment LC2 includes a first leg LEG1 and a second leg LEG2 extending therefrom. The first and second L-core segments LC1, LC2 may be designed with the flexibility as described above with respect to FIGS. 11 and 12.

The magnetic device includes a first primary winding PR1 coupled in series with a second primary winding PR2 with first, second and third primary terminals $p_1$, $p_2$, $p_3$ for connection to another circuit element of a power converter or the like. An end of the first and second primary windings PR1, PR2 are coupled together at the third primary terminal $p_3$. The first primary winding PR1 is formed around (e.g., wound around) the first leg LEG1 of the first L-core segment LC1 and the second primary winding PR2 is formed around (e.g., wound around) the first leg LEG1 of the second L-core segment LC2.

The magnetic device includes a first secondary winding SC1 coupled in parallel with a second secondary winding SC2 with first and second secondary terminals $s_1$, $s_2$ for connection to another circuit element of a power converter or the like. An end of the first and second secondary windings SC1, SC2 are coupled together. The first secondary winding SC1 is formed around (e.g., stamped and formed sheet of metal placed around) the first leg LEG1 of the first L-core segment LC1 and the second secondary winding SC2 is formed around (e.g., stamped and formed sheet of metal placed around) the first leg LEG1 of the second L-core segment LC2. The first secondary winding SC1 is formed over the first primary winding PR1 around the first leg LEG1 of the first L-core segment LC1, and the second secondary winding SC2 is formed over the second primary winding PR2 around the first leg LEG1 of the second L-core segment LC2.

The primary windings PR1, PR2 may be dielectrically isolated from respective secondary windings SC1, SC2 by an insulating layer (e.g., tape or bobbin, not shown). Additionally, the primary windings PR1, PR2 and/or the secondary windings SC1, SC2 may be dielectrically isolated from the respective first and second L-core segments LC1, LC2 by an insulating layer (e.g., tape or bobbin, not shown). The magnetic device may also be encapsulated by a protective potting material such as epoxy individually or in combination with other circuit elements as part of a power converter or the like.

Figure 17:
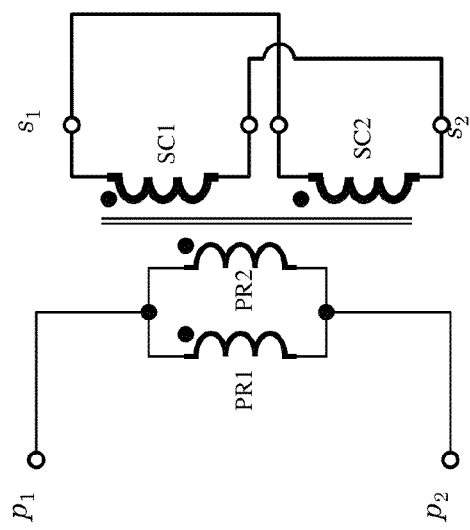
Figure 18:
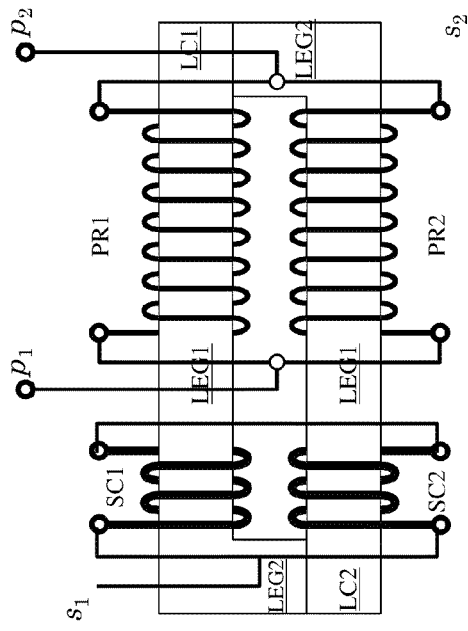
Figure 19:
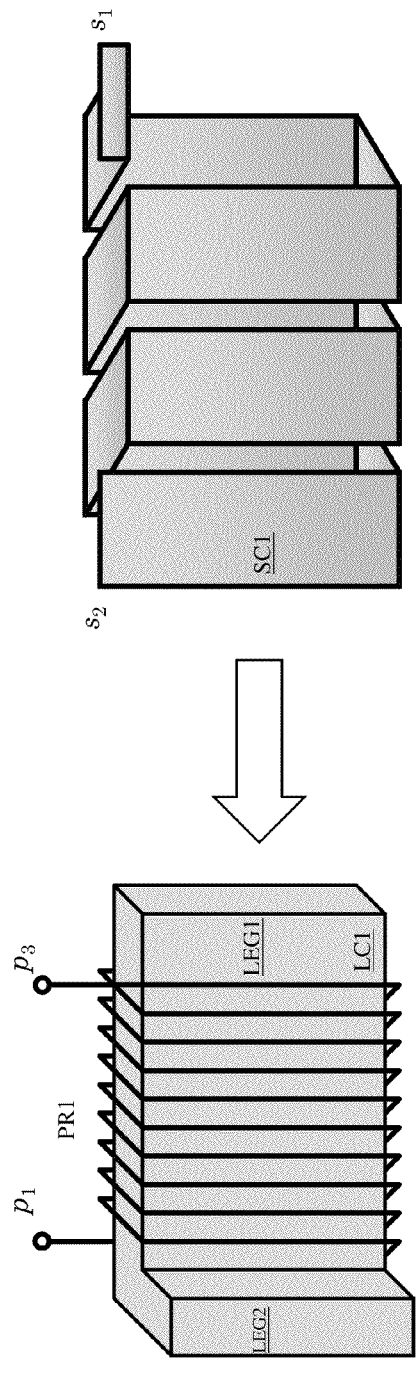
Figure 20:
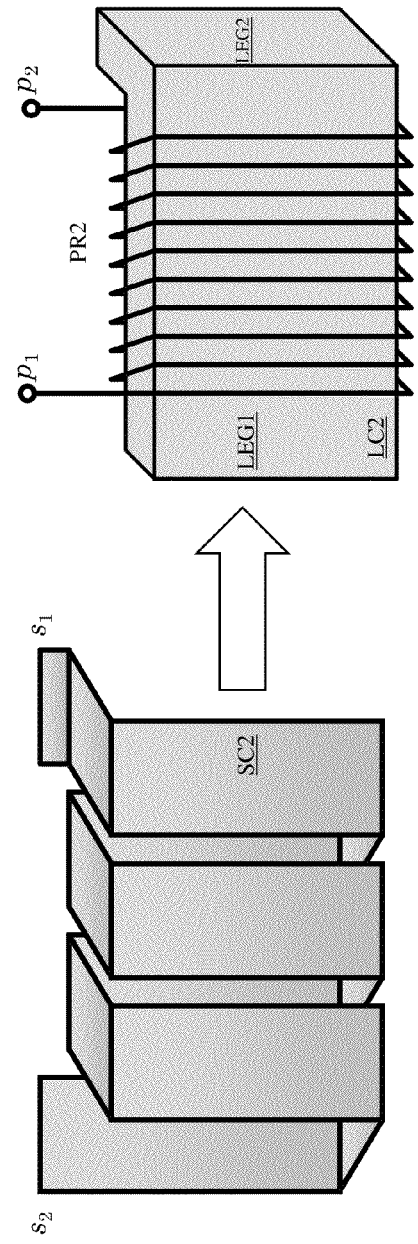

Turning now to FIGS. 17 to 20, illustrated are views of an embodiment of a magnetic device. FIGS. 17 and 18 illustrate a schematic view and a side view, respectively, of the magnetic device having primary windings coupled in parallel and secondary windings coupled in parallel around a magnetic core. FIGS. 19 and 20 illustrate partially assembled perspective views of the magnetic device. The magnetic core of the magnetic device includes a first L-core segment LC1 and an opposing second L-core segment LC2. The first L-core segment LC1 includes a first leg LEG1 and a second leg LEG2 extending therefrom. The second L-core segment LC2 includes a first leg LEG1 and a second leg LEG2 extending therefrom. The first and second L-core segments LC1, LC2 may be designed with the flexibility as described above with respect to FIGS. 11 and 12.

The magnetic device includes a first primary winding PR1 coupled in parallel with a second primary winding PR2 with first and second primary terminals $p_1$, $p_2$ for connection to another circuit element of a power converter or the like. Ends of the first and second primary windings PR1, PR2 are coupled together at the first and second primary terminals $p_1$, $p_2$. The first primary winding PR1 is formed around (e.g., wound around) the first leg LEG1 of the first L-core segment LC1 and the second primary winding PR2 is formed around (e.g., wound around) the first leg LEG1 of the second L-core segment LC2.

The magnetic device includes a first secondary winding SC1 coupled in parallel with a second secondary winding SC2 with first and second secondary terminals $s_1$, $s_2$ for connection to another circuit element of a power converter or the like. An end of the first and second secondary windings SC1, SC2 are coupled together. The first secondary winding SC1 is formed around (e.g., stamped and formed sheet of metal placed around) the first leg LEG1 of the first L-core segment LC1 and the second secondary winding SC2 is formed around (e.g., stamped and formed sheet of metal placed around) the first leg LEG1 of the second L-core segment LC2. The first secondary winding SC1 is formed over the first primary winding PR1 around the first leg LEG1 of the first L-core segment LC1, and the second secondary winding SC2 is formed over the second primary winding PR2 around the first leg LEG1 of the second L-core segment LC2.

The primary windings PR1, PR2 may be dielectrically isolated from respective secondary windings SC1, SC2 by an insulating layer (e.g., tape or bobbin, not shown). Additionally, the primary windings PR1, PR2 and/or the secondary windings SC1, SC2 may be dielectrically isolated from the respective first and second L-core segments LC1, LC2 by an insulating layer (e.g., tape or bobbin, not shown). The magnetic device may also be encapsulated by a protective potting material such as epoxy individually or in combination with other circuit elements as part of a power converter or the like.

Thus, a magnetic device, a method of forming the same and a power converter have been introduced herein. In one embodiment, the magnetic device includes a first L-core segment including a first leg and a second leg extending therefrom. The magnetic device also includes an opposing second L-core segment including a first leg and a second leg extending therefrom. The magnetic device further includes a winding formed around at least one of the first leg and the second leg of the first L-core segment or the second L-core segment. In one embodiment, the second leg of the first L-core segment is substantially perpendicular to the first leg of the first L-core segment and the second leg of the second L-core segment is substantially perpendicular to the first leg of the second L-core segment. Additionally, a length of the first leg of the first L-core segment is elongated with respect to a length of the second leg of the first L-core segment and a length of the first leg of the second L-core segment is elongated with respect to a length of the second leg of the second L-core segment. Additionally, a thickness of the first leg and the second leg of the first L-core segment is substantially equal and a thickness of the first leg and the second leg of the second L-core segment is substantially equal.

In one embodiment, a primary winding is formed around the first leg of the first L-core segment and a secondary winding is formed around one of the first leg of the first L-core segment and the first leg of the second L-core segment. In yet another embodiment, a first primary winding is formed around the first leg of the first L-core segment in series with a second primary winding formed around the first leg of the second L-core segment. Alternatively, a first primary winding is formed around the first leg of the first L-core segment in parallel with a second primary winding formed around the first leg of the second L-core segment. In a related embodiment, a first secondary winding is formed around the first leg of the first L-core segment in parallel with a second secondary winding formed around the first leg of the second L-core segment. Additionally, a first secondary winding is formed over a first primary winding around the first leg of the first L-core segment, and a second secondary winding is formed over a second primary winding around the first leg of the second L-core segment. The first and second secondary windings are stamped and formed sheets of metal.

Figure 22:
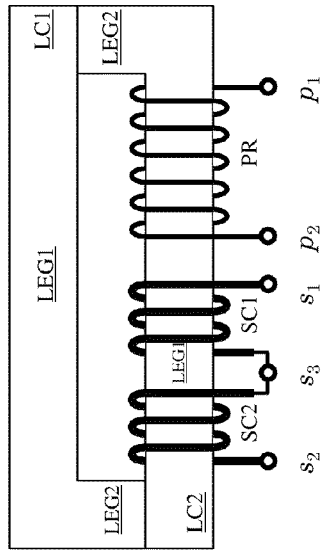
Figure 21:
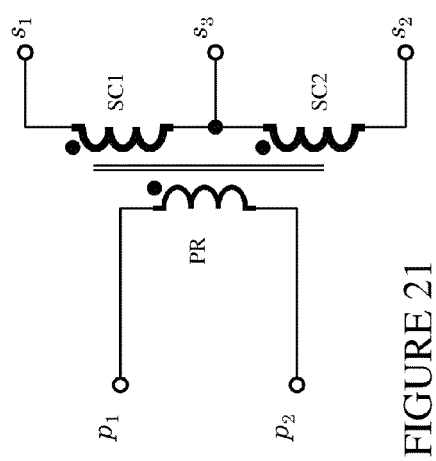
Figure 23:
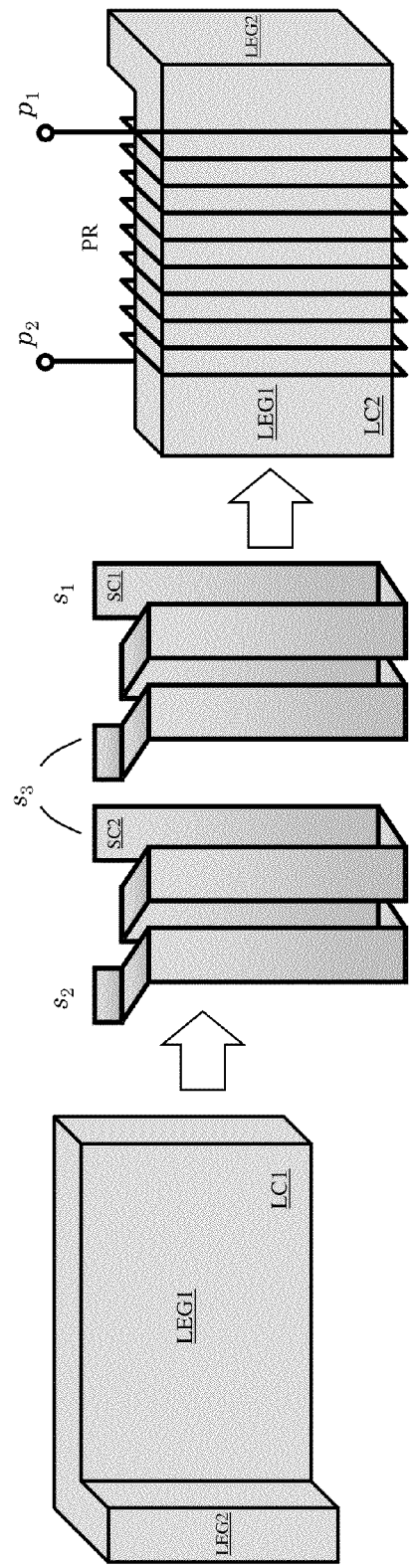

Turning now to FIGS. 21 to 23, illustrated are views of an embodiment of a magnetic device. FIGS. 21 and 22 illustrate a schematic view and a side view, respectively, of the magnetic device having a primary winding and center-tapped secondary windings around a magnetic core. FIG. 23 illustrates a partially assembled perspective view of the magnetic device. The magnetic core of the magnetic device includes a first L-core segment LC1 and an opposing second L-core segment LC2. The first L-core segment LC1 includes a first leg LEG1 and a second leg LEG2 extending therefrom. The second L-core segment LC2 includes a first leg LEG1 and a second leg LEG2 extending therefrom. The first and second L-core segments LC1, LC2 may be designed with the flexibility as described above with respect to FIGS. 11 and 12.

The magnetic device includes a primary winding PR with first and second primary terminals $p_1$, $p_2$ for connection to another circuit element of a power converter or the like. The primary winding PR is formed around (e.g., wound around) the first leg LEG1 of the second L-core segment LC2. The magnetic device includes center-tapped secondary windings with a first secondary winding SC1 and a second secondary winding SC2 with first, second and third secondary terminals $s_1$, $s_2$, $s_3$ for connection to another circuit element of a power converter or the like. The center tap of the center-tapped secondary windings is coupled to the third secondary terminal $s_3$. The first and second secondary windings SC1, SC2 are formed around (e.g., stamped and formed sheet of metal placed around) the first leg LEG1 of the second L-core segment LC2. The first and second secondary windings SC1, SC2 are formed over the primary winding PR around the first leg LEG1 of the second L-core segment LC2.

The primary winding PR may be dielectrically isolated from the secondary windings SC1, SC2 by an insulating layer (e.g., tape or bobbin, not shown). Additionally, the primary winding PR and/or the secondary windings SC1, SC2 may be dielectrically isolated from the second L-core segment LC2 by an insulating layer (e.g., tape or bobbin, not shown). The magnetic device may also be encapsulated by a protective potting material such as epoxy individually or in combination with other circuit elements as part of a power converter or the like.

Figure 24:
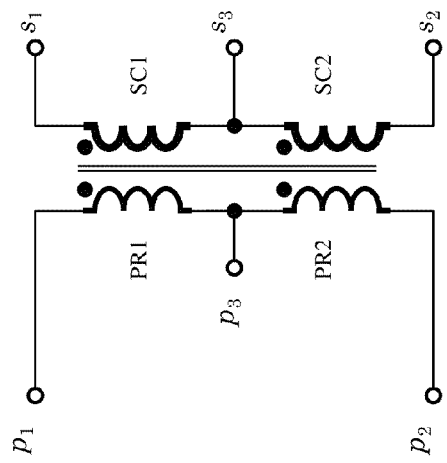
Figure 25:
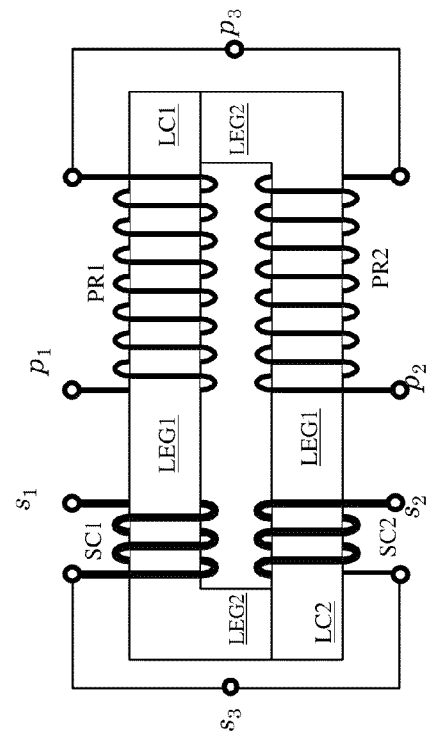

Turning now to FIGS. 24 to 27, illustrated are views of an embodiment of a magnetic device. FIGS. 24 and 25 illustrate a schematic view and a side view, respectively, of the magnetic device having primary windings coupled in series and center-tapped secondary windings around a magnetic core. FIGS. 26 and 27 illustrate partially assembled perspective views of the magnetic device. The magnetic core of the magnetic device includes a first L-core segment LC1 and an opposing second L-core segment LC2. The first L-core segment LC1 includes a first leg LEG1 and a second leg LEG2 extending therefrom. The second L-core segment LC2 includes a first leg LEG1 and a second leg LEG2 extending therefrom. The first and second L-core segments LC1, LC2 may be designed with the flexibility as described above with respect to FIGS. 11 and 12.

The magnetic device includes a first primary winding PR1 coupled in series with a second primary winding PR2 with first, second and third primary terminals $p_1$, $p_2$, $p_3$ for connection to another circuit element of a power converter or the like. An end of the first and second primary windings PR1, PR2 are coupled together at the third primary terminal $p_3$. The first primary winding PR1 is formed around (e.g., wound around) the first leg LEG1 of the first L-core segment LC1 and the second primary winding PR2 is formed around (e.g., wound around) the first leg LEG1 of the second L-core segment LC2.

The magnetic device includes center-tapped secondary windings with a first secondary winding SC1 and a second secondary winding SC2 with first, second and third secondary terminals $s_1$, $s_2$, $s_3$ for connection to another circuit element of a power converter or the like. The center tap of the center-tapped secondary windings is coupled to the third secondary terminal $s_3$. The first secondary winding SC1 is formed around (e.g., stamped and formed sheet of metal placed around) the first leg LEG1 of the first L-core segment LC1 and the second secondary winding SC2 is formed around (e.g., stamped and formed sheet of metal placed around) the first leg LEG1 of the second L-core segment LC2. The first secondary winding SC1 is formed over the first primary winding PR1 around the first leg LEG1 of the first L-core segment LC1, and the second secondary winding SC2 is formed over the second primary winding PR2 around the first leg LEG1 of the second L-core segment LC2.

The primary windings PR1, PR2 may be dielectrically isolated from respective secondary windings SC1, SC2 by an insulating layer (e.g., tape or bobbin, not shown). Additionally, the primary windings PR1, PR2 and/or the secondary windings SC1, SC2 may be dielectrically isolated from the respective first and second L-core segments LC1, LC2 by an insulating layer (e.g., tape or bobbin, not shown). The magnetic device may also be encapsulated by a protective potting material such as epoxy individually or in combination with other circuit elements as part of a power converter or the like.

Figure 28:
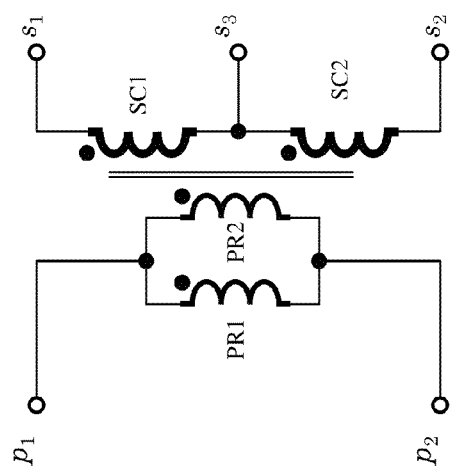
Figure 29:
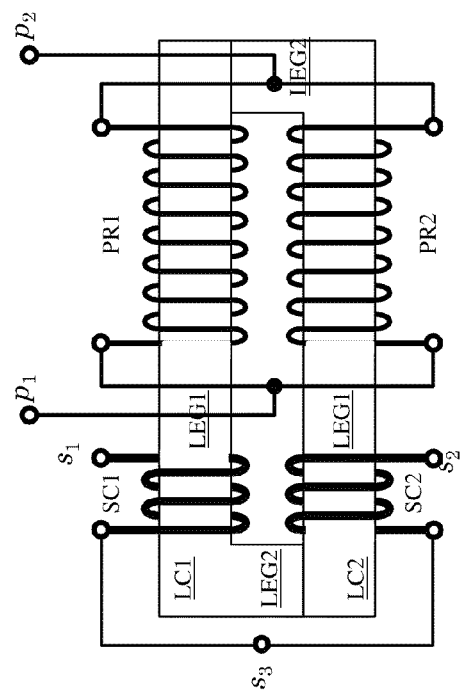
Figure 30:
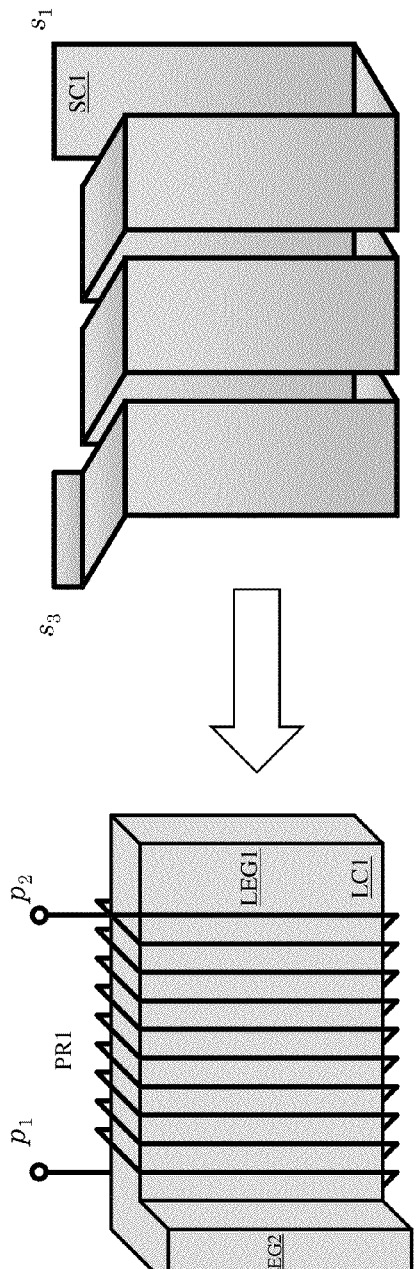
Figure 31:
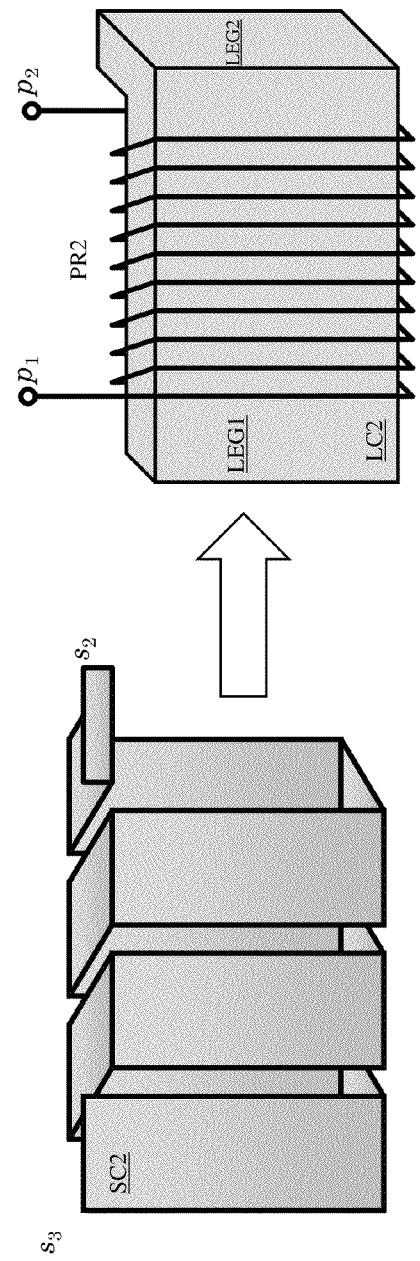

Turning now to FIGS. 28 to 31, illustrated are views of an embodiment of a magnetic device. FIGS. 28 and 29 illustrate a schematic view and a side view, respectively, of the magnetic device having primary windings coupled in parallel and center-tapped secondary windings around a magnetic core. FIGS. 30 and 31 illustrate partially assembled perspective views of the magnetic device. The magnetic core of the magnetic device includes a first L-core segment LC1 and an opposing second L-core segment LC2. The first L-core segment LC1 includes a first leg LEG1 and a second leg LEG2 extending therefrom. The second L-core segment LC2 includes a first leg LEG1 and a second leg LEG2 extending therefrom. The first and second L-core segments LC1, LC2 may be designed with the flexibility as described above with respect to FIGS. 11 and 12.

The magnetic device includes a first primary winding PR1 coupled in parallel with a second primary winding PR2 with first and second and primary terminals $p_1$, $p_2$ for connection to another circuit element of a power converter or the like. Ends of the first and second primary windings PR1, PR2 are coupled together at the first and second primary terminals $p_1$, $p_2$. The first primary winding PR1 is formed around (e.g., wound around) the first leg LEG1 of the first L-core segment LC1 and the second primary winding PR2 is formed around (e.g., wound around) the first leg LEG1 of the second L-core segment LC2.

The magnetic device includes center-tapped secondary windings with a first secondary winding SC1 and a second secondary winding SC2 with first, second and third secondary terminals $s_1$, $s_2$, $s_3$ for connection to another circuit element of a power converter or the like. The center tap of the center-tapped secondary windings is coupled to the third secondary terminal $s_3$. The first secondary winding SC1 is formed around (e.g., stamped and formed sheet of metal placed around) the first leg LEG1 of the first L-core segment LC1 and the second secondary winding SC2 is formed around (e.g., stamped and formed sheet of metal placed around) the first leg LEG1 of the second L-core segment LC2. The first secondary winding SC1 is formed over the first primary winding PR1 around the first leg LEG1 of the first L-core segment LC1, and the second secondary winding SC2 is formed over the second primary winding PR2 around the first leg LEG1 of the second L-core segment LC2.

The primary windings PR1, PR2 may be dielectrically isolated from respective secondary windings SC1, SC2 by an insulating layer (e.g., tape or bobbin, not shown). Additionally, the primary windings PR1, PR2 and/or the secondary windings SC1, SC2 may be dielectrically isolated from the respective first and second L-core segments LC1, LC2 by an insulating layer (e.g., tape or bobbin, not shown). The magnetic device may also be encapsulated by a protective potting material such as epoxy individually or in combination with other circuit elements as part of a power converter or the like.

Thus, a magnetic device, a method of forming the same and a power converter have been introduced herein. In one embodiment, the magnetic device includes a first L-core segment including a first leg and a second leg extending therefrom. The magnetic device also includes an opposing second L-core segment including a first leg and a second leg extending therefrom. The magnetic device further includes a center-tapped secondary winding with a first secondary winding and a second secondary winding formed around at least one of the first leg and the second leg of the first L-core segment or the second L-core segment. In one embodiment, the second leg of the first L-core segment is substantially perpendicular to the first leg of the first L-core segment and the second leg of the second L-core segment is substantially perpendicular to the first leg of the second L-core segment. Additionally, a length of the first leg of the first L-core segment is elongated with respect to a length of the second leg of the first L-core segment and a length of the first leg of the second L-core segment is elongated with respect to a length of the second leg of the second L-core segment. Additionally, a thickness of the first leg and the second leg of the first L-core segment is substantially equal and a thickness of the first leg and the second leg of the second L-core segment is substantially equal.

In one embodiment, the first and second secondary windings are formed around the first leg of the second L-core segment. The magnetic device may also include a primary winding formed around at least one of the first leg and the second leg of the first L-core segment or the second L-core segment. In a related embodiment, the magnetic device may include a primary winding formed around the first leg of the second L-core segment, and the first and second secondary windings are formed over the primary winding around the first leg of the second L-core segment. The first and second secondary windings are stamped and formed sheets of metal. In another embodiment, the magnetic device includes a first primary winding formed around the first leg of the first L-core segment and a second primary winding formed around the first leg of the second L-core segment. In accordance therewith, the first secondary winding is formed over the first primary winding around the first leg of the first L-core segment and the second secondary winding is formed over the second primary winding around the first leg of the second L-core segment.

Figure 32:
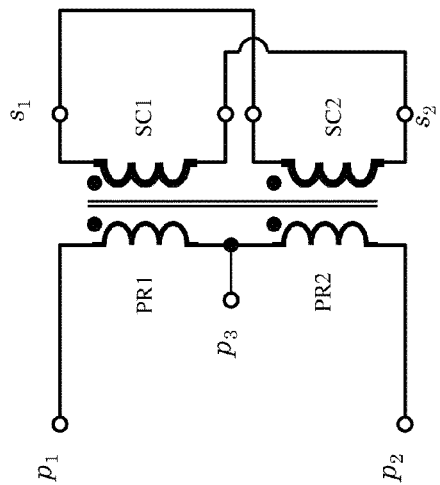
Figure 33:
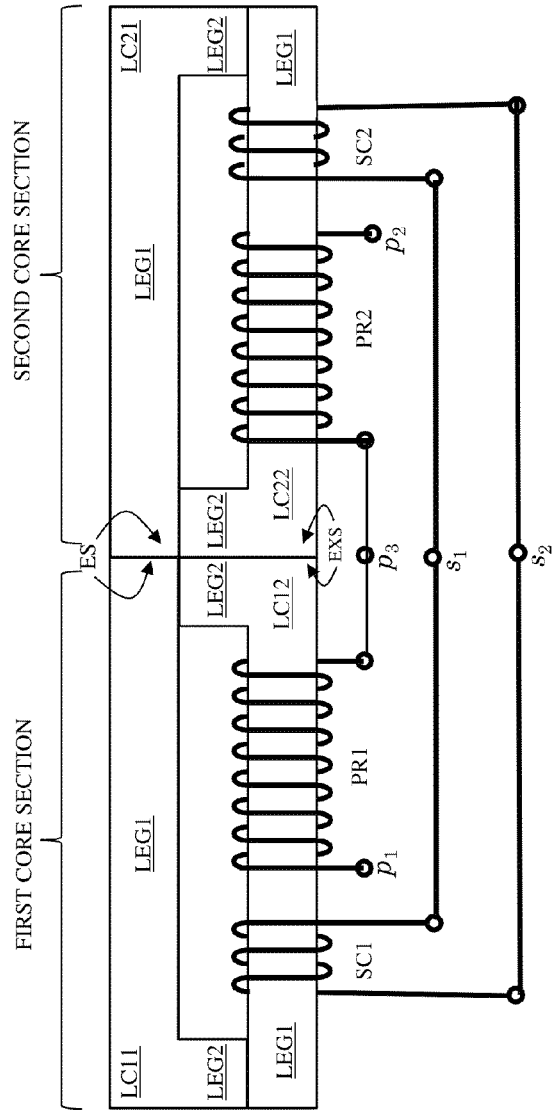
Figure 34:
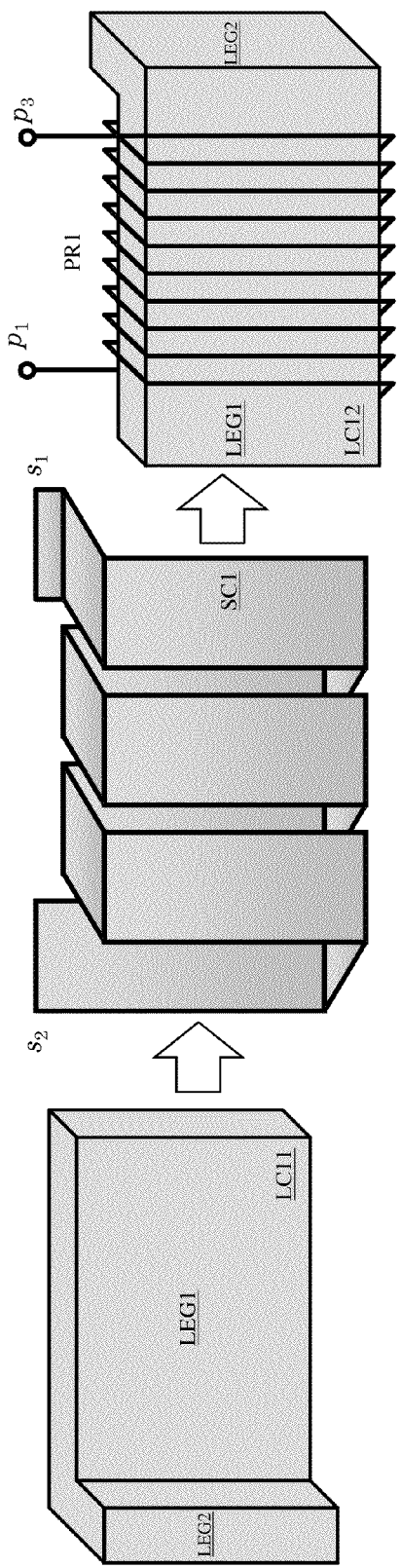
Figure 35:
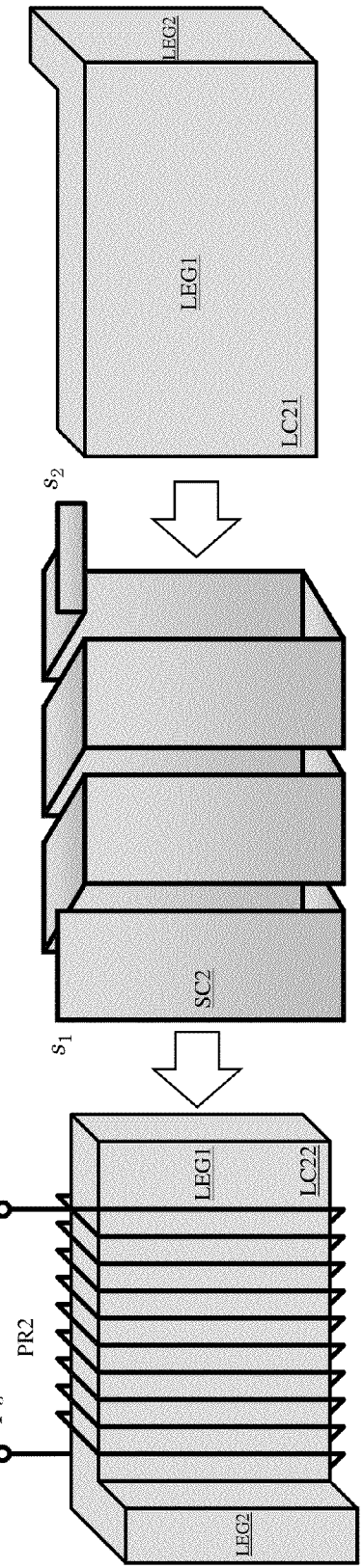

Turning now to FIGS. 32 to 35, illustrated are views of an embodiment of a magnetic device. FIGS. 32 and 33 illustrate a schematic view and a side view, respectively, of a magnetic device formed as an E-core magnetic device having primary windings coupled in series and secondary windings coupled in parallel around a magnetic core. FIGS. 34 and 35 illustrate partially assembled perspective views of the E-core magnetic device. The magnetic core of the E-core magnetic device includes a first core section including a first L-core segment LC11 and an opposing second L-core segment LC12. The first L-core segment LC11 includes a first leg LEG1 and a second leg LEG2 extending therefrom. The second L-core segment LC12 includes a first leg LEG1 and a second leg LEG2 extending therefrom. The magnetic core of the E-core magnetic device includes a second core section including a first L-core segment LC21 and an opposing second L-core segment LC22. The first L-core segment LC21 includes a first leg LEG1 and a second leg LEG2 extending therefrom. The second L-core segment LC22 includes a first leg LEG1 and a second leg LEG2 extending therefrom. In the illustrated embodiment, exterior surfaces EXS of the second leg LEG2 of the second L-core segments LC12, LC22 of the first and second core sections, respectively, are mated together (e.g., glued, adhesively secured or banded together). Also, end surfaces ES of the first leg LEG1 of the first L-core segments LC11, LC21 of the first and second core sections, respectively, are mated together (e.g., glued, adhesively secured or banded together). The first and second L-core segments LC11, LC12, LC21, LC22 may be designed with the flexibility as described above with respect to FIGS. 11 and 12.

The magnetic device includes a first primary winding PR1 coupled in series with a second primary winding PR2 with first, second and third primary terminals $p_1$, $p_2$, $p_3$ for connection to another circuit element of a power converter or the like. An end of the first and second primary windings PR1, PR2 are coupled together at the third primary terminal $p_3$. The first primary winding PR1 is formed around (e.g., wound around) the first leg LEG1 of the second L-core segment LC12 of the first core section and the second primary winding PR2 is formed around (e.g., wound around) the first leg LEG1 of the second L-core segment LC22 of the second core section.

The magnetic device includes a first secondary winding SC1 coupled in parallel with a second secondary winding SC2 with first and second secondary terminals $s_1$, $s_2$ for connection to another circuit element of a power converter or the like. An end of the first and second secondary windings SC1, SC2 are coupled together. The first secondary winding SC1 is formed around (e.g., stamped and formed sheet of metal placed around) the first leg LEG1 of the second L-core segment LC12 of the first core section and the second secondary winding SC2 is formed around (e.g., stamped and formed sheet of metal placed around) the first leg LEG1 of the second L-core segment LC22 of the second core section. The first secondary winding SC1 is formed over the first primary winding PR1 around the first leg LEG1 of the second L-core segment LC12 of the first core section, and the second secondary winding SC2 is formed over the second primary winding PR2 around the first leg LEG1 of the second L-core segment LC22 of the second core section.

The primary windings PR1, PR2 may be dielectrically isolated from respective secondary windings SC1, SC2 by an insulating layer (e.g., tape or bobbin, not shown). Additionally, the primary windings PR1, PR2 and/or the secondary windings SC1, SC2 may be dielectrically isolated from the respective second L-core segments LC12, LC22 by an insulating layer (e.g., tape or bobbin, not shown). The magnetic device may also be encapsulated by a protective potting material such as epoxy individually or in combination with other circuit elements as part of a power converter or the like.

Figure 37:
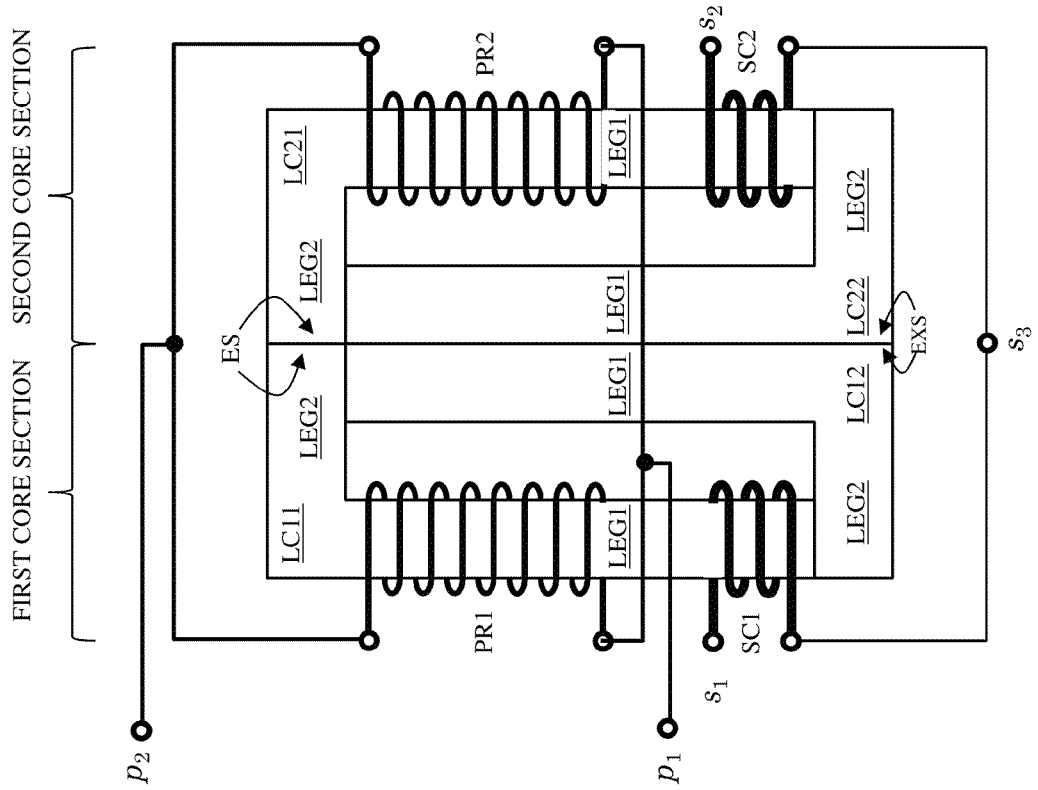
Figure 36:
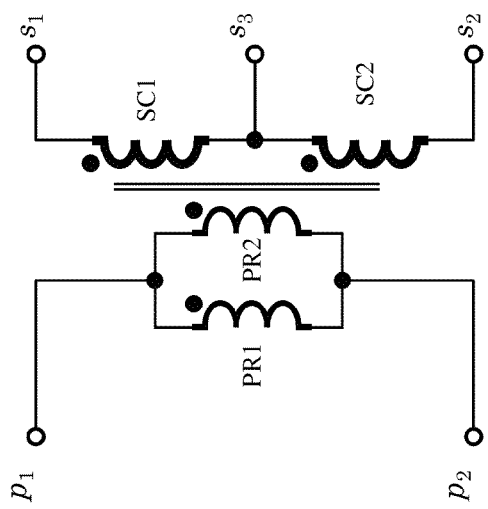
Figure 38:
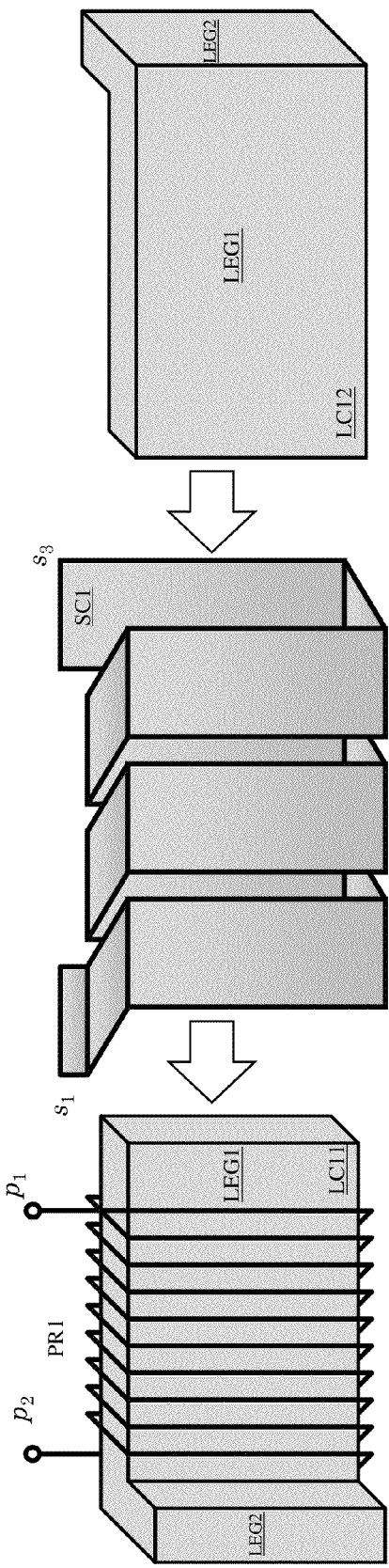
Figure 39:
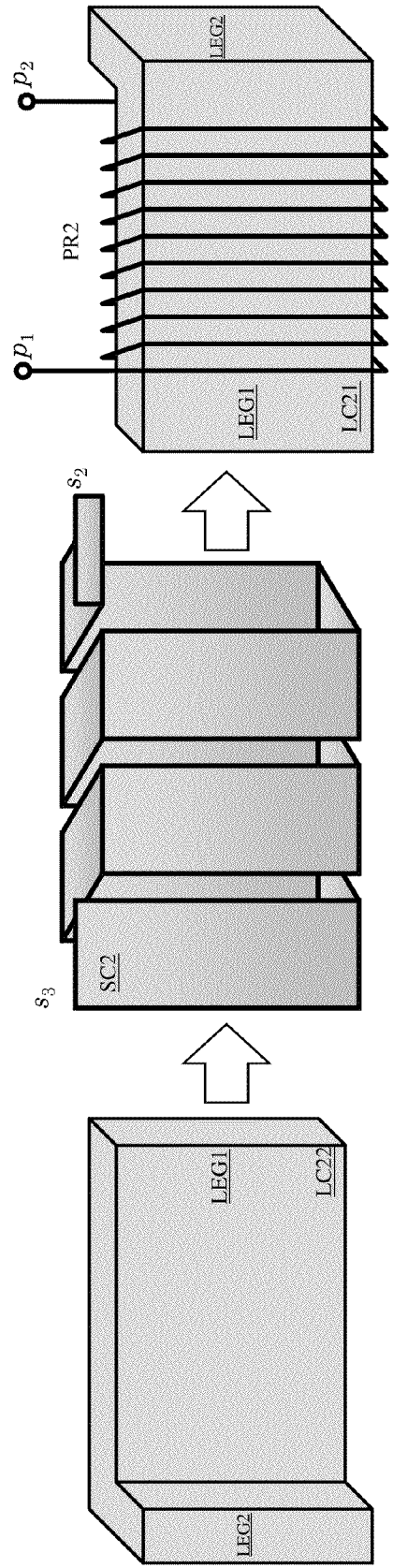

Turning now to FIGS. 36 to 39, illustrated are views of an embodiment of a magnetic device. FIGS. 36 and 37 illustrate a schematic view and a side view, respectively, of a magnetic device formed as an E-core magnetic device having primary windings coupled in parallel and center-tapped secondary windings around a magnetic core. FIGS. 38 and 39 illustrate partially assembled perspective views of the E-core magnetic device. The magnetic core of the E-core magnetic device includes a first core section including a first L-core segment LC11 and an opposing second L-core segment LC12. The first L-core segment LC11 includes a first leg LEG1 and a second leg LEG2 extending therefrom. The second L-core segment LC12 includes a first leg LEG1 and a second leg LEG2 extending therefrom. The magnetic core of the E-core magnetic device includes a second core section including a first L-core segment LC21 and an opposing second L-core segment LC22. The first L-core segment LC21 includes a first leg LEG1 and a second leg LEG2 extending therefrom. The second L-core segment LC22 includes a first leg LEG1 and a second leg LEG2 extending therefrom. In the illustrated embodiment, exterior surfaces EXS of the first leg LEG1 of the second L-core segments LC12, LC22 of the first and second core sections, respectively, are mated together (e.g., glued, adhesively secured or banded together). Also, end surfaces ES of the second leg LEG2 of the first L-core segments LC11, LC21 of the first and second core sections, respectively, are mated together (e.g., glued, adhesively secured or banded together). The first and second L-core segments LC11, LC12, LC21, LC22 may be designed with the flexibility as described above with respect to FIGS. 11 and 12.

The magnetic device includes a first primary winding PR1 coupled in parallel with a second primary winding PR2 with first and second and primary terminals $p_1$, $p_2$ for connection to another circuit element of a power converter or the like. Ends of the first and second primary windings PR1, PR2 are coupled together at the first and second primary terminals $p_1$, $p_2$. The first primary winding PR1 is formed around (e.g., wound around) the first leg LEG1 of the first L-core segment LC11 of the first core section and the second primary winding PR2 is formed around (e.g., wound around) the first leg LEG1 of the first L-core segment LC21 of the second core section.

The magnetic device includes center-tapped secondary windings with a first secondary winding SC1 and a second secondary winding SC2 with first, second and third secondary terminals $s_1$, $s_2$, $s_3$ for connection to another circuit element of a power converter or the like. The center tap of the center-tapped secondary windings is coupled to the third secondary terminal $s_3$. The first secondary winding SC1 is formed around (e.g., stamped and formed sheet of metal placed around) the first leg LEG1 of the first L-core segment LC11 of the first core section and the second secondary winding SC2 is formed around (e.g., stamped and formed sheet of metal placed around) the first leg LEG1 of the first L-core segment LC21 of the second core section. The first secondary winding SC1 is formed over the first primary winding PR1 around the first leg LEG1 of the first L-core segment LC11 of the first core section, and the second secondary winding SC2 is formed over the second primary winding PR2 around the first leg LEG1 of the first L-core segment LC21 of the second core section.

The primary windings PR1, PR2 may be dielectrically isolated from respective secondary windings SC1, SC2 by an insulating layer (e.g., tape or bobbin, not shown). Additionally, the primary windings PR1, PR2 and/or the secondary windings SC1, SC2 may be dielectrically isolated from the respective first L-core segments LC11, LC21 by an insulating layer (e.g., tape or bobbin, not shown). The magnetic device may also be encapsulated by a protective potting material such as epoxy individually or in combination with other circuit elements as part of a power converter or the like.

Thus, a magnetic device, a method of forming the same and a power converter have been introduced herein. In one embodiment, the magnetic device includes a first core section having a first L-core segment including a first leg and a second leg extending therefrom, and an opposing second L-core segment including a first leg and a second leg extending therefrom. The magnetic device also includes a second core section having a first L-core segment including a first leg and a second leg extending therefrom, and an opposing second L-core segment including a first leg and a second leg extending therefrom. A surface of the second core section is mated (e.g., adhesively secured) to a surface of the first core section. In one embodiment, the second leg of the first L-core segment of the first core section is substantially perpendicular to the first leg of the first L-core segment of the first core section, and the second leg of the second L-core segment of the first core section is substantially perpendicular to the first leg of the second L-core segment of the first core section. Additionally, a length of the first leg of the first L-core segment of the first core section is elongated with respect to a length of the second leg of the first L-core segment of the first core section, and a length of the first leg of the second L-core segment of the first core section is elongated with respect to a length of the second leg of the second L-core segment of the first core section Additionally, a thickness of the first leg and the second leg of the first L-core segment of the first core section is substantially equal and a thickness of the first leg and the second leg of the second L-core segment of the first core section is substantially equal.

In one embodiment, a winding is formed around at least one of the first leg and the second leg of the first L-core segment or the second L-core segment of the first core section, and a winding is formed around at least one of the first leg and the second leg of the first L-core segment or the second L-core segment of the second core section. Regarding the mating of the first and second core sections, an end surface of the first leg of the first L-core segment of the first core section is mated to an end surface of the first leg of the first L-core segment of the second core section, and an exterior surface of the second leg of the second L-core segment of the first core section is mated to an exterior surface of the second leg of the second L-core segment of the second core section. Alternatively, an end surface of the second leg of the first L-core segment of the first core section is mated to an end surface of the second leg of the first L-core segment of the second core section, and an exterior surface of the first leg of the second L-core segment of the first core section is mated to an exterior surface of the first leg of the second L-core segment of the second core section.

In one embodiment, the magnetic device includes first and second primary windings formed around the first leg of the second L-core segment of the first and second core sections, respectively, and first and second secondary windings are formed around the first leg of the second L-core segment of the first and second core sections, respectively. Alternatively, the magnetic device includes first and second primary windings formed around the first leg of the first L-core segment of the first and second core sections, respectively, and first and second secondary windings are formed around the first leg of the first L-core segment of the first and second core sections, respectively.

Turning now to FIGS. 40 to 41, illustrated is a schematic view and a side view, respectively, of a magnetic device in the form of a coupled inductor. The magnetic core of the coupled inductor includes a first core section including a first L-core segment LC11 and an opposing second L-core segment LC12. The first L-core segment LC11 includes a first leg LEG1 and a second leg LEG2 extending therefrom. The second L-core segment LC12 includes a first leg LEG1 and a second leg LEG2 extending therefrom. The magnetic core of the coupled inductor includes a second core section including a first L-core segment LC21 and an opposing second L-core segment LC22. The first L-core segment LC21 includes a first leg LEG1 and a second leg LEG2 extending therefrom. The second L-core segment LC22 includes a first leg LEG1 and a second leg LEG2 extending therefrom. In the illustrated embodiment, exterior surfaces EXS of the second leg LEG2 of the second L-core segments LC12, LC22 of the first and second core sections, respectively, are mated together (e.g., glued, adhesively secured or banded together). Also, end surfaces ES of the first leg LEG1 of the first L-core segments LC11, LC21 of the first and second core sections, respectively, are mated together (e.g., glued, adhesively secured or banded together). The first and second L-core segments LC11, LC12, LC21, LC22 may be designed with the flexibility as described above with respect to FIGS. 11 and 12.

The magnetic device includes center-tapped secondary windings with a first secondary winding SC1 and a second secondary winding SC2 with first, second and third secondary terminals $s_1$, $s_2$, $s_3$ for connection to another circuit element of a power converter or the like. The center tap of the center-tapped secondary windings is coupled to an inductor winding IC and to the third secondary terminal $s_3$. The first secondary winding SC1 is formed around (e.g., stamped and formed sheet of metal placed around) the first leg LEG1 of the second L-core segment LC12 of the first core section and the second secondary winding SC2 is formed around (e.g., stamped and formed sheet of metal placed around) the first leg LEG1 of the second L-core segment LC22 of the second core section. The inductor winding IC is formed around the second leg LEG2 of the second L-core segments LC12, LC22 of the first core section and the second core section, respectively.

The secondary windings SC1, SC2 and/or the inductor winding IC may be dielectrically isolated from the respective second L-core segments LC12, LC22 by an insulating layer (e.g., tape or bobbin, not shown). The magnetic device may also be encapsulated by a protective potting material such as epoxy individually or in combination with other circuit elements as part of a power converter or the like. It should be noted that the coupled inductor including forming the secondary windings SC1, SC2 and/or the inductor winding IC about the first and second core sections may be assembled as described above.

Turning now to FIG. 42, illustrated is a side view of an embodiment of a magnetic core of a magnetic device in the form of a coupled inductor. The magnetic core of FIG. 42 is analogous to the magnetic core of FIG. 41 with the addition of gaps therein. A first gap (designated "a") supports energy storage and a second gap (designated "b") substantially prevents circulating magnetic flux. The first gap "a" may be created by grinding down the second leg LEG2 of the second L-core segments LC12, LC22 of the first and second core sections, respectively. The second gap "b" may be created by placing a spacer (partially shown and designated "s") between the exterior surfaces EXS of the second leg LEG2 of the second L-core segments LC12, LC22 of the first and second core sections, respectively. The gaps "a", "b" may be formed by, without limitation, air, a filler such as an epoxy or a spacer "s". For ease of illustration, the second gap "b" is shown as partially filled with air or other filler (an upper portion thereof) and partially filled with the spacer "s". Thus, the magnetic device includes at least one gap between a pair of adjacent legs therein. Of course, windings may be formed around the magnetic core of the coupled inductor as illustrated above.

Turning now to FIGS. 43 to 44, illustrated is a schematic view and a side view, respectively, of a magnetic device in the form of a coupled inductor. The magnetic core of the coupled inductor includes a first core section including a first L-core segment LC11 and an opposing second L-core segment LC12. The first L-core segment LC11 includes a first leg LEG1 and a second leg LEG2 extending therefrom. The second L-core segment LC12 includes a first leg LEG1 and a second leg LEG2 extending therefrom. The magnetic core of the coupled inductor includes a second core section including a first L-core segment LC21 and an opposing second L-core segment LC22. The first L-core segment LC21 includes a first leg LEG1 and a second leg LEG2 extending therefrom. The second L-core segment LC22 includes a first leg LEG1 and a second leg LEG2 extending therefrom. In the illustrated embodiment, exterior surfaces EXS of the first leg LEG1 of the second L-core segments LC12, LC22 of the first and second core sections, respectively, are mated together (e.g., glued, adhesively secured or banded together). Also, end surfaces ES of the second leg LEG2 of the first L-core segments LC11, LC21 of the first and second core sections, respectively, are mated together (e.g., glued, adhesively secured or banded together). The first and second L-core segments LC11, LC12, LC21, LC22 may be designed with the flexibility as described above with respect to FIGS. 11 and 12.

The magnetic device includes center-tapped secondary windings with a first secondary winding SC1 and a second secondary winding SC2 with first, second and third secondary terminals $s_1$, $s_2$, $s_3$ for connection to another circuit element of a power converter or the like. The center tap of the center-tapped secondary windings is coupled to an inductor winding IC and to the third secondary terminal $s_3$. The first secondary winding SC1 is formed around (e.g., stamped and formed sheet of metal placed around) the first leg LEG1 of the first L-core segment LC11 of the first core section and the second secondary winding SC2 is formed around (e.g., stamped and formed sheet of metal placed around) the first leg LEG1 of the first L-core segment LC21 of the second core section. The inductor winding IC is formed around the first leg LEG1 of the second L-core segments LC12, LC22 of the first core section and the second core section, respectively.

The secondary windings SC1, SC2 and/or the inductor winding IC may be dielectrically isolated from the respective first L-core segments LC11, LC21 and/or second L-core segments LC12, LC22 by an insulating layer (e.g., tape or bobbin, not shown). The magnetic device may also be encapsulated by a protective potting material such as epoxy individually or in combination with other circuit elements as part of a power converter or the like. It should be noted that the coupled inductor including forming the secondary windings SC1, SC2 and/or the inductor winding IC about the first and second core sections may be assembled as described above.

Turning now to FIG. 45, illustrated is a side view of an embodiment of a magnetic core of a magnetic device in the form of a coupled inductor. The magnetic core of FIG. 45 is analogous to the magnetic core of FIG. 44 with the addition of gaps therein. A first gap (designated "a") supports energy storage and a second gap (designated "b") substantially prevents circulating magnetic flux. The first gap "a" may be created by grinding down the first leg LEG1 of the second L-core segments LC12, LC22 of the first and second core sections, respectively. The second gap "b" may be created by placing a spacer (partially shown and designated "s") between the exterior surfaces EXS of the first leg LEG1 of the second L-core segments LC12, LC22 of the first and second core sections, respectively. The gaps "a", "b" may be formed by, without limitation, air, a filler such as an epoxy or a spacer "s". For ease of illustration, the second gap "b" is shown as partially filled with air or other filler (an upper portion thereof) and partially filled with the spacer "s". Thus, the magnetic device includes at least one gap between a pair of adjacent legs therein. Of course, windings may be formed around the magnetic core of the coupled inductor as illustrated above.

Thus, a magnetic device, a method of forming the same and a power converter have been introduced herein. In one embodiment, the magnetic device includes a magnetic core including a first core section and a second core section. The first core section includes a first L-core segment with a first leg and a second leg extending therefrom, and an opposing second L-core segment with a first leg and a second leg extending therefrom. The second core section includes a first L-core segment with a first leg and a second leg extending therefrom, and an opposing second L-core segment with a first leg and a second leg extending therefrom. A surface of the second core section is mated (e.g., adhesively secured) to a surface of the first core section. The magnetic device also includes a center-tapped secondary winding with a first secondary winding and a second secondary winding formed around at least one of the first leg and the second leg of the first L-core segment or the second L-core segment of the first core section or the second core section. The magnetic device also includes an inductor winding formed around at least one of the first leg and the second leg of the first L-core segment or the second L-core segment of the first core section or the second core section. The inductor winding is coupled to a center tap between the first secondary winding and the second secondary winding.

In one embodiment, the second leg of the first L-core segment of the first core section is substantially perpendicular to the first leg of the first L-core segment of the first core section, and the second leg of the second L-core segment of the first core section is substantially perpendicular to the first leg of the second L-core segment of the first core section. Also, a length of the first leg of the first L-core segment of the first core section is elongated with respect to a length of the second leg of the first L-core segment of the first core section, and a length of the first leg of the second L-core segment of the first core section is elongated with respect to a length of the second leg of the second L-core segment of the first core section. Additionally, a thickness of the first leg and the second leg of the first L-core segment of the first core section is substantially equal and a thickness of the first leg and the second leg of the second L-core segment of the first core section is substantially equal.

In one embodiment, the first secondary winding is formed around the first leg of the second L-core segment of the first core section, the second secondary winding is formed around the first leg of the second L-core segment of the second core section and the inductor winding is formed around the second leg of the second L-core segments of the first core section and the second core section. Alternatively, the first secondary winding is formed around the first leg of the first L-core segment of the first core section, the second secondary winding is formed around the first leg of the first L-core segment of the second core section and the inductor winding is formed around the first leg of the second L-core segments of the first core section and the second core section.

In one embodiment, an end surface of the first leg of the first L-core segment of the first core section is mated to an end surface of the first leg of the first L-core segment of the second core section, and an exterior surface of the second leg of the second L-core segment of the first core section is mated to an exterior surface of the second leg of the second L-core segment of the second core section. Alternatively, an end surface of the second leg of the first L-core segment of the first core section is mated to an end surface of the second leg of the first L-core segment of the second core section, and an exterior surface of the first leg of the second L-core segment of the first core section is mated to an exterior surface of the first leg of the second L-core segment of the second core section. Also, the magnetic device may include a gap between a pair of adjacent legs therein.

Figure 46:
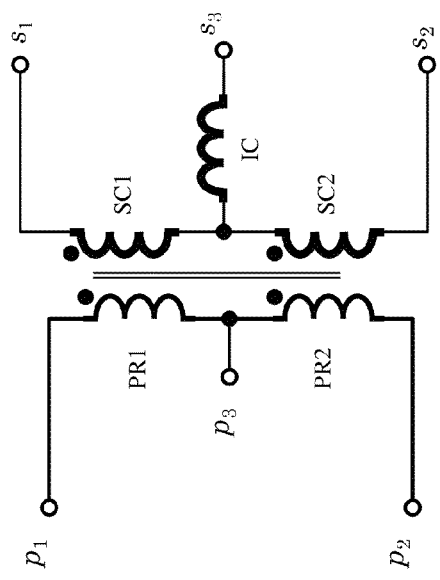
Figure 47:
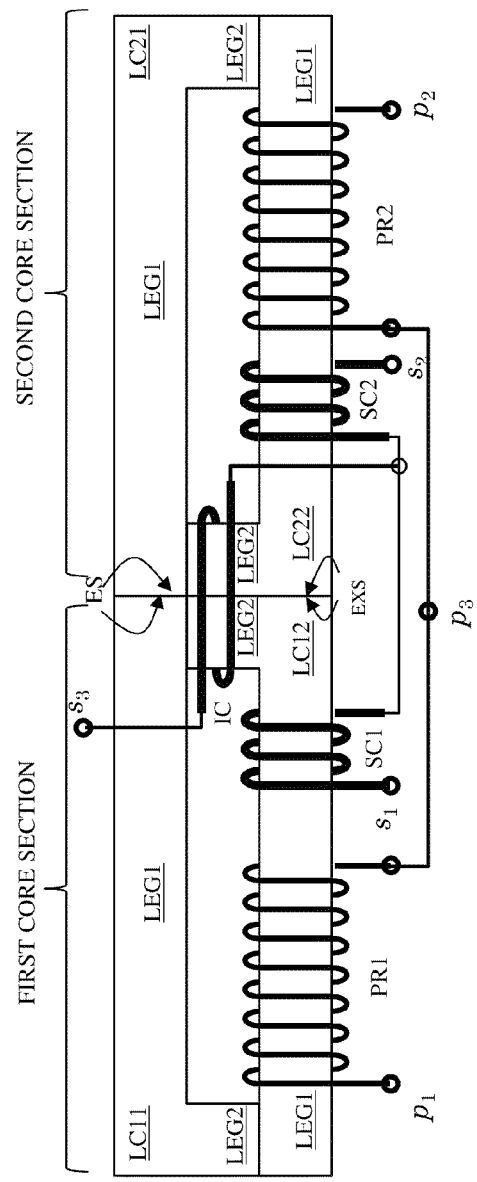

Turning now to FIGS. 46 to 47, illustrated is a schematic view and a side view, respectively, of a magnetic device in the form of an integrated magnetic device. The magnetic core of the integrated magnetic device includes a first core section including a first L-core segment LC11 and an opposing second L-core segment LC12. The first L-core segment LC11 includes a first leg LEG1 and a second leg LEG2 extending therefrom. The second L-core segment LC12 includes a first leg LEG1 and a second leg LEG2 extending therefrom. The magnetic core of the integrated magnetic device includes a second core section including a first L-core segment LC21 and an opposing second L-core segment LC22. The first L-core segment LC21 includes a first leg LEG1 and a second leg LEG2 extending therefrom. The second L-core segment LC22 includes a first leg LEG1 and a second leg LEG2 extending therefrom. In the illustrated embodiment, exterior surfaces EXS of the second leg LEG2 of the second L-core segments LC12, LC22 of the first and second core sections, respectively, are mated together (e.g., glued, adhesively secured or banded together). Also, end surfaces ES of the first leg LEG1 of the first L-core segments LC11, LC21 of the first and second core sections, respectively, are mated together (e.g., glued, adhesively secured or banded together). The first and second L-core segments LC11, LC12, LC21, LC22 may be designed with the flexibility as described above with respect to FIGS. 11 and 12.

The magnetic device includes a first primary winding PR1 coupled in series with a second primary winding PR2 with first, second and third primary terminals $p_1$, $p_2$, $p_3$ for connection to another circuit element of a power converter or the like. An end of the first and second primary windings PR1, PR2 are coupled together at the third primary terminal $p_3$. The first primary winding PR1 is formed around (e.g., wound around) the first leg LEG1 of the second L-core segment LC12 of the first core section and the second primary winding PR2 is formed around (e.g., wound around) the first leg LEG1 of the second L-core segment LC22 of the second core section.

The magnetic device includes center-tapped secondary windings with a first secondary winding SC1 and a second secondary winding SC2 with first, second and third secondary terminals $s_1$, $s_2$, $s_3$ for connection to another circuit element of a power converter or the like. The center tap of the center-tapped secondary windings is coupled to an inductor winding IC and to the third secondary terminal $s_3$. The first secondary winding SC1 is formed around (e.g., stamped and formed sheet of metal placed around) the first leg LEG1 of the second L-core segment LC12 of the first core section and the second secondary winding SC2 is formed around (e.g., stamped and formed sheet of metal placed around) the first leg LEG1 of the second L-core segment LC22 of the second core section. The inductor winding IC is formed around the second leg LEG2 of the second L-core segments LC12, LC22 of the first core section and the second core section, respectively.

The primary windings PR1, PR2 may be dielectrically isolated from respective secondary windings SC1, SC2 or the inductor winding IC by an insulating layer (e.g., tape or bobbin, not shown). Additionally, the primary windings PR1, PR2, and/or the secondary windings SC1, SC2 and/or the inductor winding IC may be dielectrically isolated from the respective second L-core segments LC12, LC22 by an insulating layer (e.g., tape or bobbin, not shown). The magnetic device may also be encapsulated by a protective potting material such as epoxy individually or in combination with other circuit elements as part of a power converter or the like. It should be noted that the integrated magnetic device including forming the primary windings PR1, PR2, the secondary windings SC1, SC2 and/or the inductor winding IC about the first and second core sections may be assembled as described above.

Figure 49:
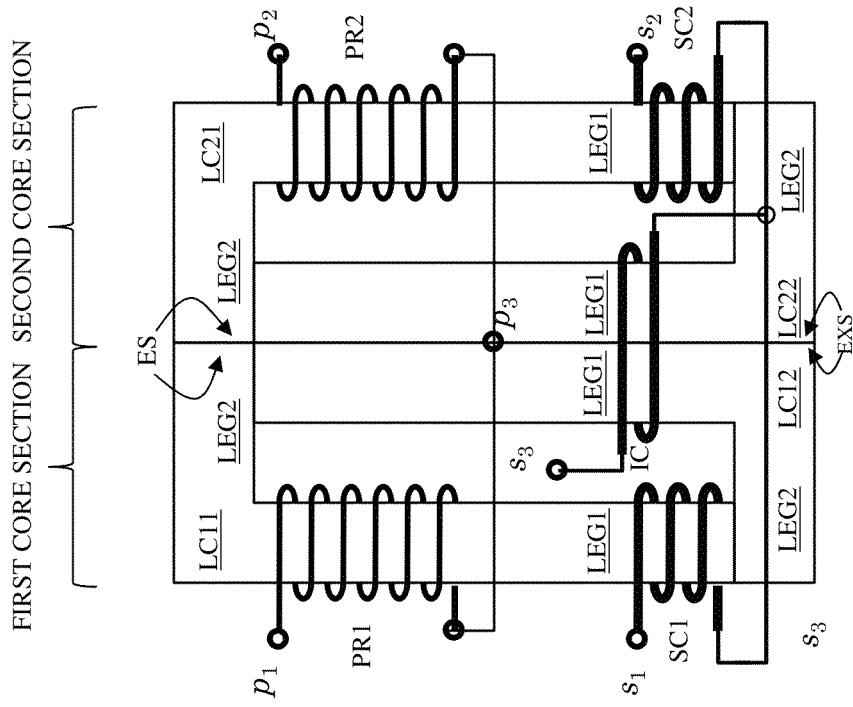
Figure 48:
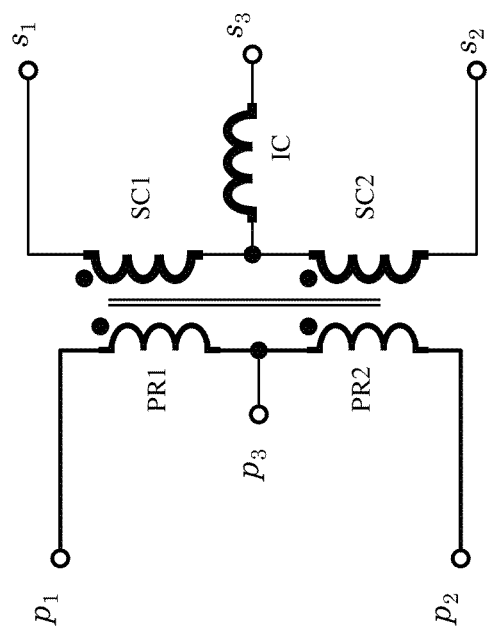

Turning now to FIGS. 48 to 49, illustrated is a schematic view and a side view, respectively, of a magnetic device in the form of an integrated magnetic device. The magnetic core of the integrated magnetic device includes a first core section including a first L-core segment LC11 and an opposing second L-core segment LC12. The first L-core segment LC11 includes a first leg LEG1 and a second leg LEG2 extending therefrom. The second L-core segment LC12 includes a first leg LEG1 and a second leg LEG2 extending therefrom. The magnetic core of the integrated magnetic device includes a second core section including a first L-core segment LC21 and an opposing second L-core segment LC22. The first L-core segment LC21 includes a first leg LEG1 and a second leg LEG2 extending therefrom. The second L-core segment LC22 includes a first leg LEG1 and a second leg LEG2 extending therefrom. In the illustrated embodiment, exterior surfaces EXS of the first leg LEG1 of the second L-core segments LC12, LC22 of the first and second core sections, respectively, are mated together (e.g., glued, adhesively secured or banded together). Also, end surfaces ES of the second leg LEG2 of the first L-core segments LC11, LC21 of the first and second core sections, respectively, are mated together (e.g., glued, adhesively secured or banded together). The first and second L-core segments LC11, LC12, LC21, LC22 may be designed with the flexibility as described above with respect to FIGS. 11 and 12.

The magnetic device includes a first primary winding PR1 coupled in series with a second primary winding PR2 with first, second and third primary terminals $p_1$, $p_2$, $p_3$ for connection to another circuit element of a power converter or the like. An end of the first and second primary windings PR1, PR2 are coupled together at the third primary terminal $p_3$. The first primary winding PR1 is formed around (e.g., wound around) the first leg LEG1 of the first L-core segment LC11 of the first core section and the second primary winding PR2 is formed around (e.g., wound around) the first leg LEG1 of the first L-core segment LC21 of the second core section.

The magnetic device includes center-tapped secondary windings with a first secondary winding SC1 and a second secondary winding SC2 with first, second and third secondary terminals $s_1$, $s_2$, $s_3$ for connection to another circuit element of a power converter or the like. The center tap of the center-tapped secondary windings is coupled to an inductor winding IC and to the third secondary terminal $s_3$. The first secondary winding SC1 is formed around (e.g., stamped and formed sheet of metal placed around) the first leg LEG1 of the first L-core segment LC11 of the first core section and the second secondary winding SC2 is formed around (e.g., stamped and formed sheet of metal placed around) the first leg LEG1 of the first L-core segment LC21 of the second core section. The inductor winding IC is formed around the first leg LEG1 of the second L-core segments LC12, LC22 of the first core section and the second core section, respectively.

The primary windings PR1, PR2 may be dielectrically isolated from respective secondary windings SC1, SC2 or the inductor winding IC by an insulating layer (e.g., tape or bobbin, not shown). Additionally, the primary windings PR1, PR2, and/or the secondary windings SC1, SC2 and/or the inductor winding IC may be dielectrically isolated from the respective first L-core segments LC11, LC21 and/or second L-core segments LC12, LC22 by an insulating layer (e.g., tape or bobbin, not shown). The magnetic device may also be encapsulated by a protective potting material such as epoxy individually or in combination with other circuit elements as part of a power converter or the like. It should be noted that the integrated magnetic device including forming the primary windings PR1, PR2, the secondary windings SC1, SC2 and/or the inductor winding IC about the first and second core sections may be assembled as described above.

Thus, a magnetic device, a method of forming the same and a power converter have been introduced herein. In one embodiment, the magnetic device includes a magnetic core including a first core section and a second core section. The first core section includes a first L-core segment with a first leg and a second leg extending therefrom, and an opposing second L-core segment with a first leg and a second leg extending therefrom. The second core section includes a first L-core segment with a first leg and a second leg extending therefrom, and an opposing second L-core segment with a first leg and a second leg extending therefrom. A surface of the second core section is mated (e.g., adhesively secured) to a surface of the first core section. The magnetic device includes a first primary winding and a second primary winding formed around at least one of the first leg and the second leg of the first L-core segment or the second L-core segment of the first core section or the second core section. The magnetic device also includes a center-tapped secondary winding with a first secondary winding and a second secondary winding formed around at least one of the first leg and the second leg of the first L-core segment or the second L-core segment of the first core section or the second core section. The magnetic device also includes an inductor winding formed around at least one of the first leg and the second leg of the first L-core segment or the second L-core segment of the first core section or the second core section. The inductor winding is coupled to a center tap between the first secondary winding and the second secondary winding.

In one embodiment, the second leg of the first L-core segment of the first core section is substantially perpendicular to the first leg of the first L-core segment of the first core section, and the second leg of the second L-core segment of the first core section is substantially perpendicular to the first leg of the second L-core segment of the first core section. Also, a length of the first leg of the first L-core segment of the first core section is elongated with respect to a length of the second leg of the first L-core segment of the first core section, and a length of the first leg of the second L-core segment of the first core section is elongated with respect to a length of the second leg of the second L-core segment of the first core section. Additionally, a thickness of the first leg and the second leg of the first L-core segment of the first core section is substantially equal and a thickness of the first leg and the second leg of the second L-core segment of the first core section is substantially equal.

In one embodiment, the first primary and secondary windings are formed around the first leg of the second L-core segment of the first core section, the second primary and secondary windings are formed around the first leg of the second L-core segment of the second core section, and the inductor winding is formed around the second leg of the second L-core segments of the first core section and the second core section. Alternatively, the first primary and secondary windings are formed around the first leg of the first L-core segment of the first core section, the second primary and secondary windings are formed around the first leg of the first L-core segment of the second core section, and the inductor winding is formed around the first leg of the second L-core segments of the first core section and the second core section. The first and second secondary windings may be stamped and formed sheets of metal.

In one embodiment, an end surface of the first leg of the first L-core segment of the first core section is mated to an end surface of the first leg of the first L-core segment of the second core section, and an exterior surface of the second leg of the second L-core segment of the first core section is mated to an exterior surface of the second leg of the second L-core segment of the second core section. Alternatively, an end surface of the second leg of the first L-core segment of the first core section is mated to an end surface of the second leg of the first L-core segment of the second core section, and an exterior surface of the first leg of the second L-core segment of the first core section is mated to an exterior surface of the first leg of the second L-core segment of the second core section.

The controller or related method as described above with respect to the power converters may be implemented as hardware (embodied in one or more chips including an integrated circuit such as an application specific integrated circuit), or may be implemented as software or firmware for execution by a processor (e.g., a digital signal processor) in accordance with memory. In particular, in the case of firmware or software, the exemplary embodiment can be provided as a computer program product including a computer readable medium embodying computer program code (i.e., software or firmware) thereon for execution by the processor.

Program or code segments making up the various embodiments may be stored in the computer readable medium. For instance, a computer program product including a program code stored in a computer readable medium (e.g., a non-transitory computer readable medium) may form various embodiments. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, and the like.

Those skilled in the art should understand that the previously described embodiments of a power converter including an L-core segment and related methods of forming the same are submitted for illustrative purposes only. While a magnetic device has been described in the environment of a power converter, the magnetic device may also be applied to other systems such as, without limitation, a power amplifier and a motor controller.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A magnetic device, comprising:
   a first L-core segment including a first leg and a second leg extending therefrom;
   an opposing second L-core segment including a first leg and a second leg extending therefrom;
   a winding formed around at least one of said first leg and said second leg of said first L-core segment; and
   another winding formed around at least one of said first leg and said second leg of said first L-core segment and non-interleaved with said winding.

2. The magnetic device as recited in claim 1 wherein said second leg of said first L-core segment is substantially perpendicular to said first leg of said first L-core segment, and said second leg of said second L-core segment is substantially perpendicular to said first leg of said second L-core segment.

3. The magnetic device as recited in claim 1 wherein a length of said first leg of said first L-core segment is elongated with respect to a length of said second leg of said first L-core segment, and a length of said first leg of said second L-core segment is elongated with respect to a length of said second leg of said second L-core segment.

4. The magnetic device as recited in claim 1 wherein a thickness of said first leg and said second leg of said first L-core segment is substantially equal and a thickness of said first leg and said second leg of said second L-core segment is substantially equal.

5. The magnetic device as recited in claim 1 wherein said winding is a primary winding formed around said first leg of said first L-core segment and said another winding is a secondary winding formed around one of said first leg and said second leg of said first L-core segment.

6. The magnetic device as recited in claim 1 wherein said winding is a first primary winding formed around said first leg of said first L-core segment in series with a second primary winding formed around said first leg of said second L-core segment.

7. The magnetic device as recited in claim 1 wherein a first primary winding is formed around said first leg of said first L-core segment in parallel with a second primary winding formed around said first leg of said second L-core segment.

8. The magnetic device as recited in claim 1 wherein said another winding is a first secondary winding formed around said first leg of said first L-core segment in parallel with a second secondary winding formed around said first leg of said second L-core segment.

9. The magnetic device as recited in claim 1 wherein said winding is a first primary winding formed around said first leg of said first L-core segment and said another winding is a first secondary winding formed over said first primary winding around said first leg of said first L-core segment.

10. The magnetic device as recited in claim 9 wherein a second primary winding is formed around said first leg of said second L-core segment and a second secondary winding is formed over said second primary winding around said first leg of said second L-core segment.

11. The magnetic device as recited in claim 10 wherein said first and second secondary windings are stamped and formed sheets of metal.

12. A power converter, comprising:
    a main switch coupled to an input of said power converter;
    a magnetic device coupled to said main switch, comprising:
       a first L-core segment including a first leg and a second leg extending therefrom,
       an opposing second L-core segment including a first leg and a second leg extending therefrom,
       a winding formed around at least one of said first leg and said second leg of said first L-core segment, and
       another winding formed around at least one of said first leg and said second leg of said first L-core segment and non-interleaved with said winding;
    an auxiliary switch coupled to said magnetic device; and
    an output filter capacitor coupled to said auxiliary switch and an output of said power converter.

13. The power converter as recited in claim 12 wherein said second leg of said first L-core segment is substantially perpendicular to said first leg of said first L-core segment, and said second leg of said second L-core segment is substantially perpendicular to said first leg of said second L-core segment.

14. The power converter as recited in claim 12 wherein a length of said first leg of said first L-core segment is elongated with respect to a length of said second leg of said first L-core segment, and a length of said first leg of said second L-core segment is elongated with respect to a length of said second leg of said second L-core segment.

15. The power converter as recited in claim 12 wherein a thickness of said first leg and said second leg of said first L-core segment is substantially equal and a thickness of said first leg and said second leg of said second L-core segment is substantially equal.

16. The power converter as recited in claim 12 wherein said winding is a primary winding formed around said first leg of said first L-core segment and said another winding is a secondary winding formed around one of said first leg and said second leg of said first L-core segment.

17. The power converter as recited in claim 12 wherein said winding is a first primary winding formed around said first leg of said first L-core segment in series with a second primary winding formed around said first leg of said second L-core segment.

18. The power converter as recited in claim 12 wherein said magnetic device comprises a first primary winding formed around said first leg of said first L-core segment in parallel with a second primary winding formed around said first leg of said second L-core segment.

19. The power converter as recited in claim 12 wherein said another winding is a first secondary winding formed around said first leg of said first L-core segment in parallel with a second secondary winding formed around said first leg of said second L-core segment.

20. The power converter as recited in claim 12 wherein said winding is a first primary winding formed around said first leg of said first L-core segment and said another winding is a first secondary winding formed over said first primary winding around said first leg of said first L-core segment, wherein said first secondary winding is a stamped and formed sheet of metal.

\* \* \* \* \*